US012791318B2

(12) United States Patent
Hickey

(10) Patent No.: US 12,791,318 B2
(45) Date of Patent: *Nov. 10, 2026

(54) ASSOCIATING A TELEMATICS DEVICE WITH AN ASSET TRACKER

(71) Applicant: Geotab Inc., Oakville (CA)

(72) Inventor: Owain Noel Hickey, Greenwood Village, CO (US)

(73) Assignee: Geotab Inc., Oakville (CA)

( * ) Notice: Subject to any disclaimer, the term of this patent is extended or adjusted under 35 U.S.C. 154(b) by 274 days.

This patent is subject to a terminal disclaimer.

(21) Appl. No.: 18/142,184

(22) Filed: May 2, 2023

(65) Prior Publication Data

US 2023/0368671 A1 Nov. 16, 2023

Related U.S. Application Data

(60) Provisional application No. 63/342,419, filed on May 16, 2022.

(51) Int. Cl.

| | |
|---|---|
| ***G01C 21/16*** | (2006.01) |
| ***B60G 9/00*** | (2006.01) |
| ***B60Q 9/00*** | (2006.01) |
| ***G01P 15/18*** | (2013.01) |
| ***G08G 1/00*** | (2006.01) |
| ***H04W 4/02*** | (2018.01) |
| ***H04W 4/029*** | (2018.01) |

(52) U.S. Cl.

CPC ............... *G01C 21/16* (2013.01); *B60G 9/00* (2013.01); *G01P 15/18* (2013.01); *G08G 1/20* (2013.01); *H04W 4/027* (2013.01); *H04W 4/029* (2018.02)

(58) Field of Classification Search

CPC ........... G01C 21/16; G01P 15/18; G08G 1/20; G08G 1/207; B60Q 9/00; H04W 4/029; H04W 4/027; H04W 4/021

See application file for complete search history.

(56) References Cited

U.S. PATENT DOCUMENTS 5,712,789 A 1/1998 Radican
6,429,810 B1 8/2002 De Roche
(Continued)

FOREIGN PATENT DOCUMENTS

CA 2793865 C 3/2018
EP 3 190 599 A1 7/2017
(Continued)

OTHER PUBLICATIONS

Atkinson, Redundant asset tracking. Co-pending U.S. Appl. No. 18/657,094, filed May 7, 2024.
(Continued)

*Primary Examiner* — Jonathan L Sample
*Assistant Examiner* — Abigail Lee Espinoza
(74) *Attorney, Agent, or Firm* — Wolf, Greenfield & Sacks, P.C.

(57) ABSTRACT

An asset tracker deployed in an engineless vehicle and a telematics device coupled to a vehicle both send location updates to a telematics server. The asset tracker sends location updates at a faster rate upon leaving a shipping yard, for example. The telematics server associates the vehicle and engineless vehicles, determines whether they are travelling together, and sends a notification when they are not supposed to be travelling together.

20 Claims, 12 Drawing Sheets

(56) References Cited

U.S. PATENT DOCUMENTS

| | | | |
|---|---|---|---|
| 7,069,239 | B2 | 6/2006 | Fawcett et al. |
| 7,405,655 | B2 * | 7/2008 | Ng .......... G01S 19/14 340/568.1 |
| 7,484,663 | B2 | 2/2009 | Olsen, III et al. |
| 7,667,438 | B2 | 2/2010 | Ashtiani et al. |
| 7,821,416 | B2 | 10/2010 | Venture et al. |
| 8,452,643 | B2 | 5/2013 | Spannagl |
| 8,515,413 | B1 | 8/2013 | Schilit et al. |
| 8,538,838 | B2 | 9/2013 | Doyle, III |
| 9,595,142 | B2 | 3/2017 | Greenberger |
| 9,784,587 | B1 | 10/2017 | Greenspan et al. |
| 10,173,486 | B1 | 1/2019 | Lee et al. |
| 10,242,572 | B2 | 3/2019 | Doyle, III |
| 10,356,577 | B1 | 7/2019 | Kugler et al. |
| 10,473,750 | B2 | 11/2019 | Hergesheimer |
| 10,616,715 | B2 | 4/2020 | Rittman et al. |
| 10,902,723 | B2 | 1/2021 | Doyle, III |
| 10,957,204 | B1 * | 3/2021 | Kumar .......... G08G 1/20 |
| 11,427,169 | B2 | 8/2022 | Ripley et al. |
| 11,526,835 | B2 | 12/2022 | Cawse et al. |
| 11,552,495 | B2 | 1/2023 | Howell et al. |
| 11,578,978 | B1 | 2/2023 | Hickey |
| 11,650,329 | B2 | 5/2023 | Howell et al. |
| 11,750,695 | B1 | 9/2023 | Gupta et al. |
| 11,954,637 | B2 | 4/2024 | Cawse et al. |
| 2003/0050038 | A1 | 3/2003 | Haave et al. |
| 2005/0189919 | A1 | 9/2005 | Tsuchiya et al. |
| 2006/0098390 | A1 | 5/2006 | Ashtiani et al. |
| 2006/0100777 | A1 * | 5/2006 | Staton .......... B60R 25/04 701/468 |
| 2006/0261944 | A1 | 11/2006 | Ng et al. |
| 2008/0061963 | A1 | 3/2008 | Schnitz et al. |
| 2009/0204354 | A1 | 8/2009 | Davis et al. |
| 2011/0063138 | A1 * | 3/2011 | Berkobin .......... G08G 1/207 340/988 |
| 2011/0106624 | A1 | 5/2011 | Bonner et al. |
| 2011/0133888 | A1 * | 6/2011 | Stevens .......... G06Q 10/0833 340/8.1 |
| 2013/0147617 | A1 | 6/2013 | Boling et al. |
| 2013/0247184 | A1 | 9/2013 | Mahadik et al. |
| 2013/0278227 | A1 | 10/2013 | Knitt et al. |
| 2013/0328703 | A1 | 12/2013 | Doyle, III |
| 2014/0125501 | A1 | 5/2014 | Baade |
| 2014/0372335 | A1 | 12/2014 | Jones et al. |
| 2015/0243172 | A1 | 8/2015 | Eskilson |
| 2016/0212586 | A1 | 7/2016 | Ziskind et al. |
| 2017/0278061 | A1 | 9/2017 | Skaaksrud |
| 2018/0059251 | A1 | 3/2018 | Elliott |
| 2019/0066042 | A1 | 2/2019 | Conlon |
| 2019/0103755 | A1 | 4/2019 | Seberger et al. |
| 2019/0220077 | A1 | 7/2019 | Tuan et al. |
| 2019/0391634 | A1 | 12/2019 | Ayoub |
| 2020/0004996 | A1 | 1/2020 | Kawaguchi et al. |
| 2020/0160722 | A1 | 5/2020 | Brugman et al. |
| 2020/0196117 | A1 | 6/2020 | Denninghoff |
| 2020/0336995 | A1 | 10/2020 | Ripplinger et al. |
| 2020/0380326 | A1 | 12/2020 | Kawaguchi et al. |
| 2020/0409929 | A1 | 12/2020 | Kodavarti et al. |
| 2020/0412163 | A1 | 12/2020 | Huang et al. |
| 2021/0264789 | A1 | 8/2021 | Jo et al. |
| 2021/0304120 | A1 | 9/2021 | Hill et al. |
| 2021/0304592 | A1 | 9/2021 | Lepp et al. |
| 2021/0312726 | A1 | 10/2021 | Schäfer et al. |
| 2021/0325547 | A1 | 10/2021 | Howell et al. |
| 2021/0326807 | A1 | 10/2021 | Howell et al. |
| 2021/0328451 | A1 | 10/2021 | Howell et al. |
| 2022/0147922 | A1 | 5/2022 | Cawse et al. |
| 2022/0373639 | A1 | 11/2022 | Shaw et al. |
| 2023/0112513 | A1 | 4/2023 | Cawse et al. |

FOREIGN PATENT DOCUMENTS

| | | | |
|---|---|---|---|
| EP | 3 358 359 | A1 | 1/2020 |
| GB | 2 540 039 | A | 1/2017 |
| WO | WO 2020/069581 | A1 | 4/2020 |

OTHER PUBLICATIONS

Santa et al., Telematic platform for integral management of agricultural/perishable goods in terrestrial logistics. Computers and Electronics in Agriculture. Jan. 1, 2012;80:31-40.

Atkinson, Redundant asset tracking. Co-pending U.S. Appl. No. 17/684,611, filed Mar. 2, 2022.

Cawse et al., Asset travel monitoring with linked asset tracking devices. Co-pending U.S. Appl. No. 17/991,225, filed Nov. 21, 2022.

Extended European Search Report for European Application No. 23168582.7, dated Oct. 11, 2023.

* cited by examiner

ASSOCIATING A TELEMATICS DEVICE WITH AN ASSET TRACKER

CROSS-REFERENCE TO RELATED APPLICATIONS

This application claims the benefit under 35 U.S.C. § 119(e) to U.S. Provisional Application Ser. No. 63/342,419, titled "SYSTEMS AND METHODS FOR ASSOCIATING A TELEMATICS DEVICE WITH AN ASSET TRACKER," filed May 16, 2022, which is herein incorporated by reference in its entirety.

FIELD

The present disclosure generally relates to vehicle telematics, and more specifically to associating a telematics device with an asset tracker.

BACKGROUND

A telematics system may gather asset data using a telematics device. The telematics device may be integrated into or located onboard the asset. The asset may be a vehicle ("vehicular asset") or some stationary equipment. The telematics device may collect the asset data from the asset through a data connection with the asset. In the case of a vehicular asset, the telematics device may gather the asset data through an onboard diagnostic port (OBD). The gathered asset data may include engine revolutions-per-minute (RPM), battery voltage, fuel level, tire pressure, oil temperature, or any other asset data available through the diagnostic port. Additionally, the telematics device may gather sensor data pertaining to the asset via sensors on the telematics device. For example, the telematics device may have temperature and pressure sensors, inertial measurement units (IMU), optical sensors, and the like. Furthermore, the telematics device may gather location data pertaining to the asset from a location module on the telematics device. When the telematics device is coupled to the asset, the gathered sensor data and location data pertain to the asset. The gathered asset data, sensor data and location data may be received and recorded by a technical infrastructure of the telematics system, such as a telematics server, and used in the provision of fleet management tools, for telematics services, or for further data analysis.

SUMMARY

In one aspect of the present disclosure, there is provided a method in an asset tracker deployed in an engineless vehicle. The method comprises operating the asset tracker in low-power mode, detecting a travel motion of the asset tracker, and in response to detecting the travel motion of the asset tracker, operating the asset tracker in a tripwire detection mode. The method further comprises, determining that the asset tracker has crossed a tripwire, and operating the asset tracker in a location reporting mode in response to determining that the asset tracker has crossed the tripwire.

Operating the asset tracker in the tripwire detection mode may comprise frequently determining an asset tracker location of the asset tracker, and comparing the asset tracker location with the tripwire.

Detecting the travel motion of the asset tracker may comprise detecting a plurality of acceleration values from a 3-axis accelerometer thereof.

Determining that the asset tracker has crossed the tripwire may comprise comparing the asset tracker location to a line extending between a first point and a second point forming the tripwire.

The method may further comprise comprising receiving a zone definition comprised of a plurality of tripwires.

The method may further comprise storing the zone definition.

Determining that the asset tracker has crossed a tripwire may comprise determining that the asset tracker has crossed one tripwire of the plurality of tripwires of the zone definition.

Operating the asset tracker in a location reporting mode may comprise frequently sending a plurality of asset tracker locations to a telematics server.

In another aspect of the present disclosure, there is provided an asset tracker. The asset tracker comprises a controller, a location module, and a memory coupled to the controller. The memory is storing machine-executable programming instructions which when executed by the controller configure the asset tracker to operate in low-power mode, detect a travel motion of the asset tracker, and in response to detecting the travel motion of the asset tracker, operate in a tripwire detection mode. The machine-executable programming instructions further configure the asset tracker to determine that the asset tracker has crossed a tripwire and operate in a location reporting mode in response to determining that the asset tracker has crossed the tripwire.

The machine-executable instruction which configure the asset tracker to operate in a tripwire detection mode may comprise machine-executable programming instructions which cause the asset tracker to frequently determine an asset tracker location of the asset tracker, and compare the asset tracker location with the tripwire.

The machine-executable programming instructions which configure the asset tracker to detect the travel motion of the asset tracker may comprise machine-executable programming instructions which configure the asset tracker to detect a plurality of acceleration values from a 3-axis accelerometer of the asset tracker.

The machine-executable programming instructions may further configure the asset tracker to receive a zone definition comprised of a plurality of tripwires.

The machine-executable programming instructions which configure the asset tracker to operate in in a location reporting mode may comprise machine-executable programming instructions which configure the asset tracker to frequently send a plurality of asset tracker locations to a telematics server.

In yet another aspect of the present disclosure, there is provided a method in a telematics system including a telematics server, a telematics device couplable to a tractor, and an asset tracker couplable to a trailer. The method comprises the telematics server sending a zone definition comprising a plurality of tripwires to the asset tracker, and in response to detecting a travel motion of the asset tracker, the asset tracker operates in a tripwire detection mode. The method further comprises the asset tracker determining that it has crossed a tripwire. In response to determining that it has crossed the tripwire the asset tracker sends a first plurality of locations thereof to the telematics server. The telematics device sends a second plurality of locations thereof to the telematics server, and the telematics server determines that the tractor and the trailer are traveling together based on the first plurality of locations and the second plurality of locations.

The method may further comprise the telematics server receiving the zone definition from an administration terminal.

The method may further comprise the telematics server determining whether the tractor and the trailer should be traveling together.

Determining whether the tractor and the trailer should be traveling together may comprise querying a telematics database based on a telematics device identifier of the telematics device and an asset tracker identifier of the asset tracker.

The method may further comprise sending by the telematics server a notification to the telematics device in response to determining that the tractor and the trailer should not be travelling together.

The method may further comprise sending by the telematics server, a notification to an operator terminal in response to determining that the tractor and the trailer should not be travelling together.

BRIEF DESCRIPTION OF THE DRAWINGS

Exemplary non-limiting embodiments of the present invention are described with reference to the accompanying drawings in which.

DETAILED DESCRIPTION

Telematics System

Figure 1:
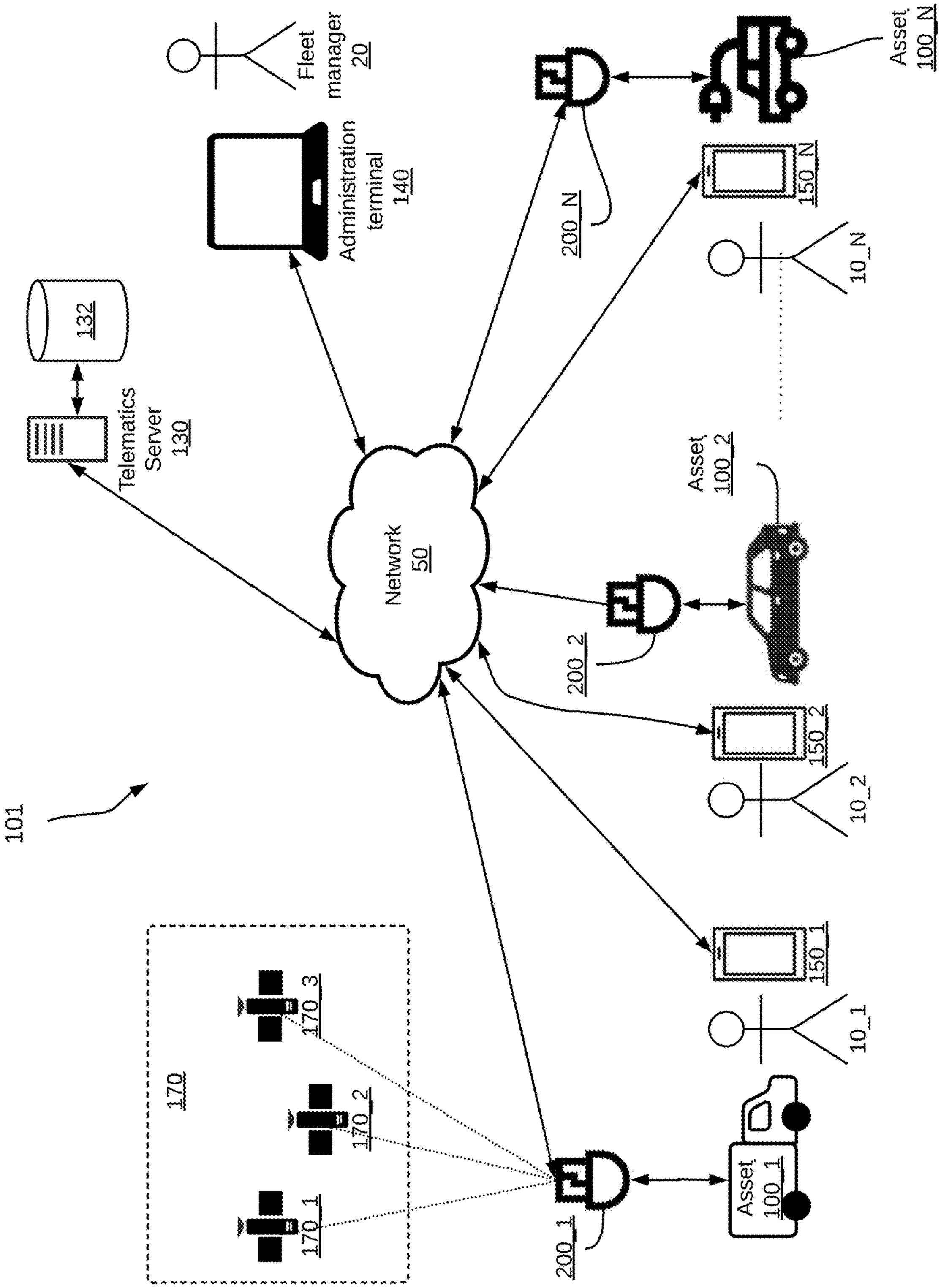
FIG. 1 is a schematic diagram of a telematics system including a plurality of telematics devices coupled to a plurality of assets, in accordance with embodiments of the present disclosure.

A large telematics system may collect data from a high number of assets, either directly or through telematic devices. A telematics device may refer to a self-contained device installed at an asset, or a telematics device that is integrated into the asset itself. In either case, it may be said that telematics data is being captured or gathered by the telematics device. FIG. 1 shows a high-level block diagram of a telematics system 101. The telematics system 101 includes a telematics server 130, (N) telematics devices shown as telematics device 200_1, telematics device 200_2 . . . through telematics device 200_N ("telematics device 200"), a network 50, administration terminal 140, and operator terminals 150_1, 150_2 . . . through 150_N ("the operator terminals 150"). FIG. 1 also shows a plurality of (N) assets named as asset 100_1, asset 100_2 . . . asset 100_N ("asset 100") coupled to the telematics device 200_1, telematics device 200_2 . . . telematics device 200_N, respectively. Additionally, FIG. 1 shows a plurality of satellites 170_1, 170_2 and 170_3 ("the satellites 170") in communication with the telematics devices 200 for facilitating navigation.

The assets 100 shown are in the form of vehicles. For example, the asset 100_1 is shown as a truck, which may be part of a fleet that delivers goods or provides services. The asset 100_2 is shown as a passenger car that typically runs on an internal combustion engine (ICE). The asset 100_3 is shown as an electric vehicle (EV). Other types of vehicles, which are not shown, are also contemplated in the various embodiments of the present disclosure, including but not limited to, farming vehicles, construction vehicles, military vehicles, and the like.

The telematics devices 200 are electronic devices which are coupled to assets 100 and configured to capture asset data from the assets 100. For example, in FIG. 1 the telematics device 200_1 is coupled to the asset 100_1. Similarly, the telematics device 200_2 is coupled to the asset 100_2 and the telematics device 200_3 is coupled to the asset 100_3. The components of a telematics device 200 are explained in further detail with reference to FIG. 2.

The network 50 may be a single network or a combination of networks such as a data cellular network, the Internet, and other network technologies. The network 50 may provide connectivity between the telematics devices 200 and the telematics server 130, between the administration terminal 140 and the telematics server 130, and between the operator terminals 150 and the telematics server 130.

The telematics server 130 is an electronic device executing machine-executable programming instructions which enable the telematics server 130 to store and analyze telematics data. The telematics server 130 may be a single computer system or a cluster of computers. The telematics server 130 may be running an operating system such as Linux, Windows, Unix, or any other equivalent operating system. Alternatively, the telematics server 130 may be a software component hosted on a cloud service, such as Amazon Web Service (AWS). The telematics server 130 is connected to the network 50 and may receive telematics data from the telematics devices 200. The telematics server 130 may have a plurality of software modules for performing data analysis and analytics on the telematics data to obtain useful asset information about the assets 100. The telematics server 130 may be coupled to a telematics database 132 for storing telematics data and/or the results of the analytics which are related to the assets 100. The asset information stored may include operator information about the operators 10 corresponding to the assets. The telematics server 130 may communicate the asset data and/or the operator information pertaining to an asset 100 to one or more of: the administration terminal 140, and the operator terminal 150.

The satellites 170 may be part of a global navigation satellite system (GNSS) and may provide location information to the telematics devices 200. The location information may be processed by a location module on the telematics device 200 to provide location data indicating the location of the telematics device 200 (and hence the location of the asset 100 coupled thereto).

The administration terminal 140 is an electronic device, which may be used to connect to the telematics server 130 to retrieve data and analytics related to one or more assets 100 or to issue commands to one or more telematics device 200 via the telematics server 130. The administration terminal 140 is shown as a laptop computer, but may also be a desktop computer, a tablet (not shown), or a smartphone. The administration terminal 140 may run a web browser or a custom application which allows retrieving data and analytics, pertaining to one or more assets 100, from the telematics server 130 via a web interface of the telematics server 130. The administration terminal 140 may also be used to issue commands to one or more telematics device 200 via the telematics server 130. A fleet manager 20 may communicate with the telematics server 130 using the administration terminal 140. In addition to retrieving data and analytics, the administration terminal 140 allows the fleet manager 20 to set alerts and geofences for keeping track of the assets 100, receiving notifications of deliveries, and so on.

The operator terminals 150 are electronic devices, such as smartphones or tablets. The operator terminals 150 are used by operators 10 (for example, vehicle drivers) of the assets 100 to both track and configure the usage of the assets 100. For example, as shown in FIG. 1, the operator 10_1 has the operator terminal 150_1, the operator 10_2 has the operator terminal 150_2, and the operator 10_N has the operator terminal 150_N. Assuming the operators 10 all belong to a fleet of vehicles, each of the operators 10 may operate any of the assets 100. For example, FIG. 1 shows that the operator 10_1 is associated with the asset 100_1, the operator 10_2 is associated with the asset 100_2, and the operator 10_N is associated with the asset 100_N. However, any operator 10 may operate any asset 100 within a particular group of assets, such as a fleet. The operator terminals 150 are in communication with the telematics server 130 over the network 50. The operator terminals 150 may run at least one asset configuration application. The asset configuration application may be used by an operator 10 to inform the telematics server 130 that the asset 100 is being currently operated by the operator 10. For example, the operator 10_2 may use an asset configuration application on the operator terminal 150_2 to indicate that the operator 10_2 is currently using the asset 100_2. The telematics server 130 updates the telematics database 132 to indicate that the asset 100_2 is currently associated with the operator 10_2. Additionally, the asset configuration application may be used to report information related to the operation duration of the vehicle, the number of stops made by the operator during their working shift, and so on. Furthermore, the asset configuration application may allow the operator to configure the telematics device 200 coupled to the asset 100 that the operator 10 is operating.

In operation, a telematics device 200 is coupled to an asset 100 to capture asset data. The asset data may be combined with location data obtained by the telematics device 200 from a location module in communication with the satellites 170 and/or sensor data gathered from sensors in the telematics device 200 or another device coupled to the telematics device 200. The combined asset data, location data, and sensor data may be termed "telematics data." The telematics device 200 sends the telematics data, to the telematics server 130 over the network 50. The telematics server 130 may process, aggregate, and analyze the telematics data to generate asset information pertaining to the assets 100 or to a fleet of assets. The telematics server 130 may store the telematics data and/or the generated asset information in the telematics database 132. The administration terminal 140 may connect to the telematics server 130, over the network 50, to access the generated asset information. Alternatively, the telematics server 130 may push the generated asset information to the administration terminal 140. Additionally, the operators 10, using their operator terminals 150, may indicate to the telematics server 130 which assets 100 they are associated with. The telematics server 130 updates the telematics database 132 accordingly to associate the operator 10 with the asset 100. Furthermore, the telematics server 130 may provide additional analytics related to the operators 10 including work time, location, and operating parameters. For example, for vehicle assets, the telematics data may include turning, speeding, and braking information. The telematics server 130 can correlate the telematics data to the vehicle's driver by querying the asset database 310. A fleet manager 20 may use the administration terminal 140 to set alerts for certain activities pertaining to the assets 100. When criteria for an alert is met, the telematics server 130 sends a message to the administration terminal 140 to notify a fleet manager 20, and may optionally send alerts to the operator terminal 150 to notify an operator 10 of the alert. For example, a vehicle driver operating the vehicle outside of a service area or hours of service may receive an alert on their operator terminal 150. A fleet manager 20 may also the administration terminal 140 to configure a telematics device 200 by issuing commands thereto via the telematics server 130. Alerts may also be sent to the telematics device 200 to generate an alert to the driver such as a beep, a displayed message, or an audio message.

Telematics Device

Figure 2:
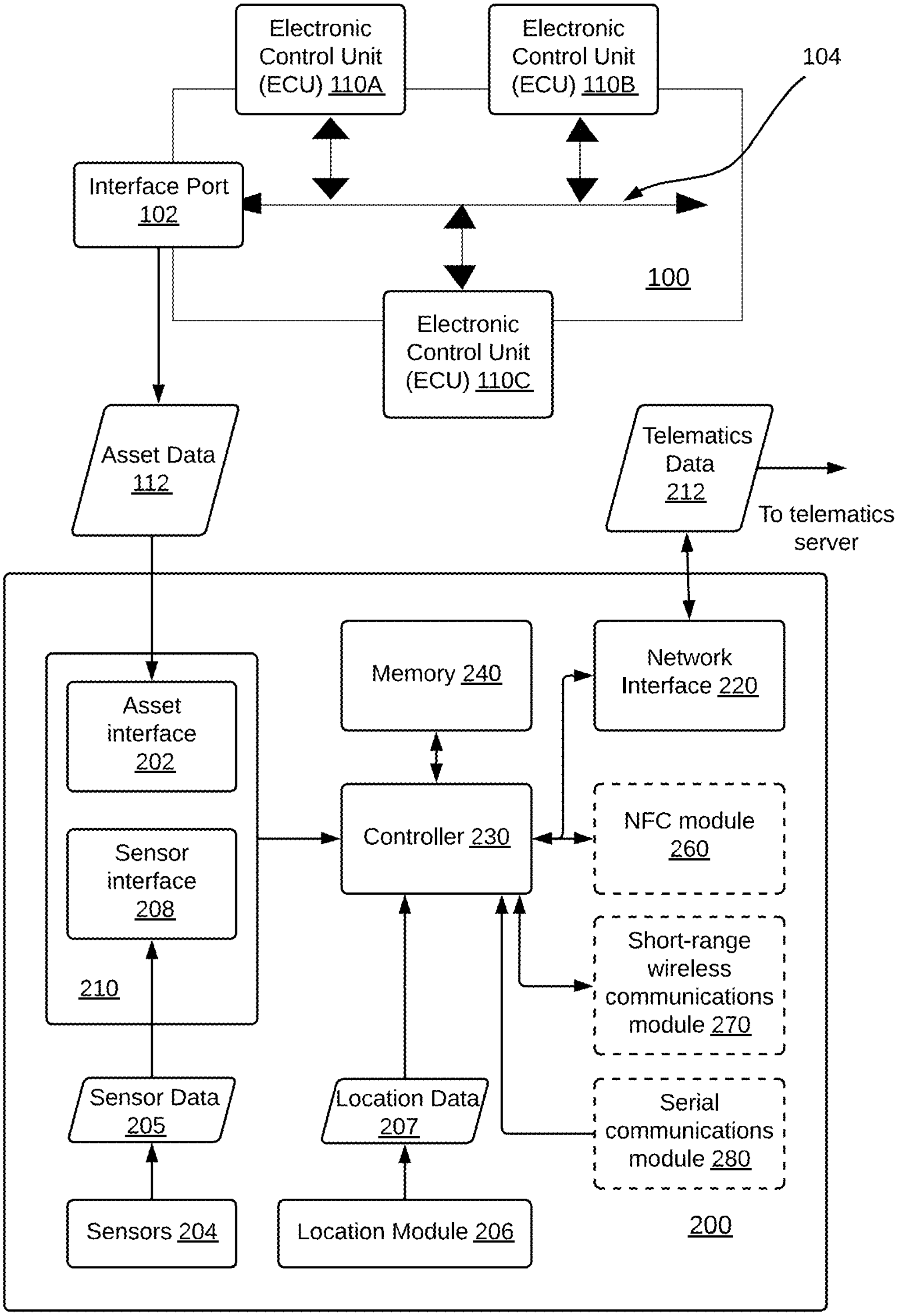
FIG. 2 is a block diagram showing a telematics device coupled to an asset, in accordance with embodiments of the present disclosure.

Further details relating to the telematics device 200 and how it interfaces with an asset 100 are shown with reference to FIG. 2. FIG. 2 depicts an asset 100 and a telematics device 200 coupled thereto. Selected relevant components of each of the asset 100 and the telematics device 200 are shown.

The asset 100 may have a plurality of electronic control units (ECUs). An ECU is an electronic module which interfaces with one or more sensors for gathering information from the asset 100. For example, an engine coolant temperature (ECT) ECU may contain a temperature sensor and a controller for converting the measured temperature into digital data representative of the oil temperature. Similarly, a battery voltage ECU may contain a voltage sensor for measuring the voltage at the positive battery terminal and a controller for converting the measured voltage into digital data representative of the battery voltage. A vehicle may, for example, have around seventy ECUs. For simplicity, only a few of the ECUs 110 are depicted in FIG. 2. For example, in the depicted embodiment the asset 100 has three ECUs shown as the ECU 110A, the ECU 110B, and the ECU 110C ("the ECUs 110"). The ECU 110A, the ECU 110B, and the ECU 110C are shown to be interconnected via an asset communications bus. One example of an asset communications bus is a Controller Area Network (CAN) bus. For example, in FIG. 2 the ECUs 110 are interconnected using the CAN bus 104. The ECUs 110 send and receive information to one another in CAN data frames by placing the information on the CAN bus 104. When an ECU 110 places information on the CAN bus 104, other ECUs 110 receive the information and may or may not consume or use that information. Different protocols may be used to exchange information between the ECUs over a CAN bus. For example, ECUs 110 in trucks and heavy vehicles use the Society of Automotive Engineering (SAE) J1939 protocol to exchange information over a CAN bus 104. Most passenger vehicles use the SAE J1979 protocol, which is commonly known as On-Board Diagnostic (OBD) protocol to exchange information between ECUs 110 on their CAN bus 104. In industrial automation, ECUs use a CANOpen protocol to exchange information over a CAN bus 104. An asset 100 may allow access to information exchanged over the CAN bus 104 via an interface port 102. For example, if the asset 100 is a passenger car, then the interface port 102 is most likely an OBD-II port. Data accessible through the interface port 102 is termed the asset data 112. In some embodiments, the interface port 102 includes a power interface for providing electric power to a telematics device 200 connected thereto.

The telematics device 200 includes a controller 230 coupled to a memory 240, an interface layer 210 and a network interface 220. The telematics device 200 also includes one or more sensors 204 and a location module 206 coupled to the interface layer 210. The telematics device 200 may also contain some optional components, shown in dashed lines in FIG. 2. For example, the telematics device 200 may contain one or more of: a near-field communications (NFC) module such as NFC module 260, a short-range wireless communications module 270, and a wired communications module such as a serial communications module 280. In some embodiments (not shown), the telematics device 200 may have a dedicated power source or a battery. In other embodiments, the telematics device 200 may receive power directly from the asset 100, via the interface port 102. The telematics device 200 shown is an example. Some of the components shown in solid lines may also be optional and may be implemented in separate modules. For example, some telematics devices (not shown) may not have a location module 206 and may rely on an external location module for obtaining the location data 207. Some telematics devices may not have any sensors 204 and may rely on external sensors for obtaining sensor data 205.

The controller 230 may include one or any combination of a processor, microprocessor, microcontroller (MCU), central processing unit (CPU), processing core, state machine, logic gate array, application-specific integrated circuit (ASIC), field-programmable gate array (FPGA), or similar, capable of executing, whether by software, hardware, firmware, or a combination of such, the actions performed by the controller 230 as described herein. The controller 230 may have an internal memory for storing machine-executable programming instructions to conduct the methods described herein.

The memory 240 may include read-only-memory (ROM), random access memory (RAM), flash memory, magnetic storage, optical storage, and similar, or any combination thereof, for storing machine-executable programming instructions and data to support the functionality described herein. The memory 240 is coupled to the controller 230 thus enabling the controller 230 to execute the machine-executable programming instructions stored in the memory 240 and to access the data stored therein. The memory 240 may contain machine-executable programming instructions, which when executed by the controller 230, configures the telematics device 200 for receiving asset data 112 from the asset 100 via the asset interface 202, and for receiving sensor data 205 from the sensors 204 and/or location data 207 from the location module 206 via the sensor interface 208. The memory 240 may also contain machine-executable programming instructions for combining asset data 112, sensor data 205 and location data 207 into telematics data 212. Additionally, the memory 240 may further contain instructions which, when executed by the controller 230, configures the telematics device 200 to transmit the telematics data 212 via the network interface 220 to a telematics server 130 over a network 50. In some embodiments, the memory 240 only stores data, and the machine-executable programming instructions for conducting the aforementioned tasks are stored in an internal memory of the controller 230.

The location module 206 may be a global positioning system (GPS) transceiver or another type of location determination peripheral that may use, for example, wireless network information for location determination. The location module 206 is coupled to the controller 230 and provides location data 207 thereto. The location data 207 may be in the form of a latitude and longitude, for example.

The sensors 204 may be one or more of: a temperature sensor, a pressure sensor, an optical sensor, a motion sensor such as an accelerometer, a gyroscope, or any other suitable sensor indicating a condition pertaining to the asset 100 to which the telematics device 200 is coupled. The sensors provide sensor data 205 to the controller 230 via the sensor interface 208.

The interface layer 210 may include a sensor interface 208 and an asset interface 202. The sensor interface 208 is configured for receiving the sensor data 205 from the sensors 204. For example, the sensor interface 208 interfaces with the sensors 204 and receives the sensor data 205 therefrom. The asset interface 202 receives asset data 112 from the asset 100. In the depicted embodiment, the asset interface 202 is coupled to the interface port 102 of the asset 100. The asset data 112, received at the telematics device 200, from the asset 100 may be in the form of data messages, such as CAN data frames. The asset data 112 may describe one or more of any of: a property, a state, and an operating condition of the asset 100. For example, where the asset 100 is a vehicle, the data may describe the speed at which the vehicle is travelling, a state of the vehicle (off, idle, or running), or an engine operating condition (e.g., engine oil temperature, engine revolutions-per-minutes (RPM), or a battery voltage). In addition to receiving the asset data 112, in some embodiments the asset interface 202 may also receive power from the asset 100 via the interface port 102. The interface layer 210 is coupled to the controller 230 and provides both the asset data 112 and the sensor data 205 to the controller 230.

The network interface 220 may include a cellular modem, such as an LTE-M modem, CAT-M modem, other cellular modem, Wi-Fi modem, or any other communication device configured for communication via the network 50 with which to communicate with the telematics server 130. The network interface 220 may be used to transmit telematics data 212 obtained from the asset 100 to the telematics server 130 for a telematics service or other purposes. The network interface 220 may also be used to receive instructions from the telematics server 130 for configuring the telematics device 200 in a certain mode and/or requesting a particular type of the asset data 112 from the asset 100.

The NFC module 260 may be an NFC reader which can read information stored on an NFC tag. The NFC module 260 may be used to confirm the identity of the operator 10 by having the operator 10 tap an NFC tag onto the telematics device 200 such that the NFC tag is read by the NFC module 260. The information read from the NFC tag may be included in the telematics data 212 sent by the telematics device 200 to the telematics server 130.

The short-range wireless communications module 270 is a component intended for providing short-range wireless communication capability to the telematics device 200. The short-range wireless communications module 270 may be a Bluetooth™. wireless fidelity (Wi-Fi), Zigbee™, or any other short-range wireless communications module. The short-range wireless communications module 270 allows other devices to communicate with the telematics device 200 over a short-range wireless network.

The serial communications module 280 is an example of a wired communications module. The serial communications module 280 is an electronic peripheral for providing serial wired communications to the telematics device 200. For example, the serial communications module 280 may include a universal asynchronous receiver transmitter (UART) providing serial communications per the RS-232 protocol. Alternatively, the serial communications module 280 may be a serial peripheral interface (SPI) bus, or an inter-integrated circuit ($I^2C$) bus. As another example, the serial communications module 280 may be a universal serial bus (USB) transceiver.

In operation, an ECU 110, such as the ECU 110A, the ECU 110B, or the ECU 110C communicates asset data over the CAN bus 104. The asset data exchanged, between the ECUs 110, over the CAN bus 104 are accessible via the interface port 102 and may be retrieved as the asset data 112 by the telematics device 200. The controller 230 of the telematics device 200 receives the asset data 112 via the asset interface 202. The controller 230 may also receive sensor data 205 from the sensors 204 over the sensor interface 208. Furthermore, the controller 230 may receive location data 207 from the location module 206. The controller 230 combines the asset data 112 with the sensor data 205 and the location data 207 to obtain the telematics data 212. The controller 230 transmits the telematics data 212 to the telematics server 130 over the network 50 via the network interface 220. Optionally, an operator 10 may tap an NFC tag to the NFC module 260 to identify themself as the operator 10 of the asset 100. Additionally, an external peripheral, such as a GPS receiver, may connect with the telematics device 200 via the short-range wireless communications module 270 or the serial communications module 280 for providing location information thereto. In some embodiments, the telematics device 200 may receive, via the network interface 220, commands from the telematics server 130. The received commands instruct the telematics device 200 to be configured in a particular way. For example, the received commands may configure the way in which the telematics device gathers asset data 112 from the asset 100 as will be described in further detail below.

The telematics data 212 which is comprised of asset data 112 gathered from the asset 100 combined with the sensor data 205 and the location data 207 may be used to derive useful data and analytics, by the telematics server 130. However, there are times when additional data, which is not provided by the asset 100, the sensors 204 or the location module 206 may be needed. The telematics device 200 may have a limited number of sensors 204 such as accelerometers or gyroscopes providing limited information about the motion of the asset 100 on which the telematics device 200 is deployed. The location module 206 may provide location and direction information. However, in some cases, more information may be needed to derive useful data and analytics pertaining to the asset 100. One example of information that is not typically provided by the telematics device 200 is video capture data. Another example of information that is not typically provided by the telematics device 200 is any proprietary signaling provided by devices which does not follow any of the standard protocols (OBD-II, J1939 or CANOpen). Some equipment may not have a CAN bus and may provide proprietary digital and/or analog signals. Examples of such devices include industrial equipment, winter maintenance equipment such as salt spreaders, farming equipment, and the like. Additionally, the telematics device 200 may not have an NFC module 260 or a short-range wireless communications module 270 thus limiting its connectivity capabilities.

The telematics device 200 may have different operating modes depending on the operating status of the vehicle. For example, if the engine of the vehicle is running and the vehicle battery is being charged by an alternator, the telematics device 200 may be in a fully powered mode. Detecting that the vehicle is running, and that the alternator is charging the battery may be determined by receiving an ignition signal, determining that the engine RPM is above a certain threshold, and determining that the device voltage is greater than a particular threshold. For example, when the ignition is on, the engine RPM is greater than five hundred revolutions per minute, and the device voltage is 13.5V (for a 12V battery), then the telematics device 200 determines that the vehicle battery is capable of providing electric power thereto and accordingly can run in fully powered mode. Alternatively, when the telematics device determines that the vehicle battery is not being charged, then the telematics device may run a power-saving scheme in order not to drain the vehicle battery. In a power-saving scheme, the telematics device may power off some or all of components thereof for periods of time to save battery power. For example, the telematics device may enter a sleep mode and wake up every 30 minutes to report the location data 207 to the telematics server 130 over the network interface 220. This entails powering up the network interface 220, the location module 206, the controller 230 for obtaining the location data 207 and sending the location data 207 as part of the telematics data 212 over the network 50 to the telematics server 130. In some cases, the telematics device 200 that has been in the same location for an extended period of time may enter into an extended power-saving scheme in which the telematics device may be in the sleep mode for several hours and wake up to verify that the location has not changed once every several hours. In some cases, the telematics device 200 exits the extended power-saving scheme when detecting motion as determined by the sensors 204 such as accelerometers.

Input/Output Expander

Figure 3:
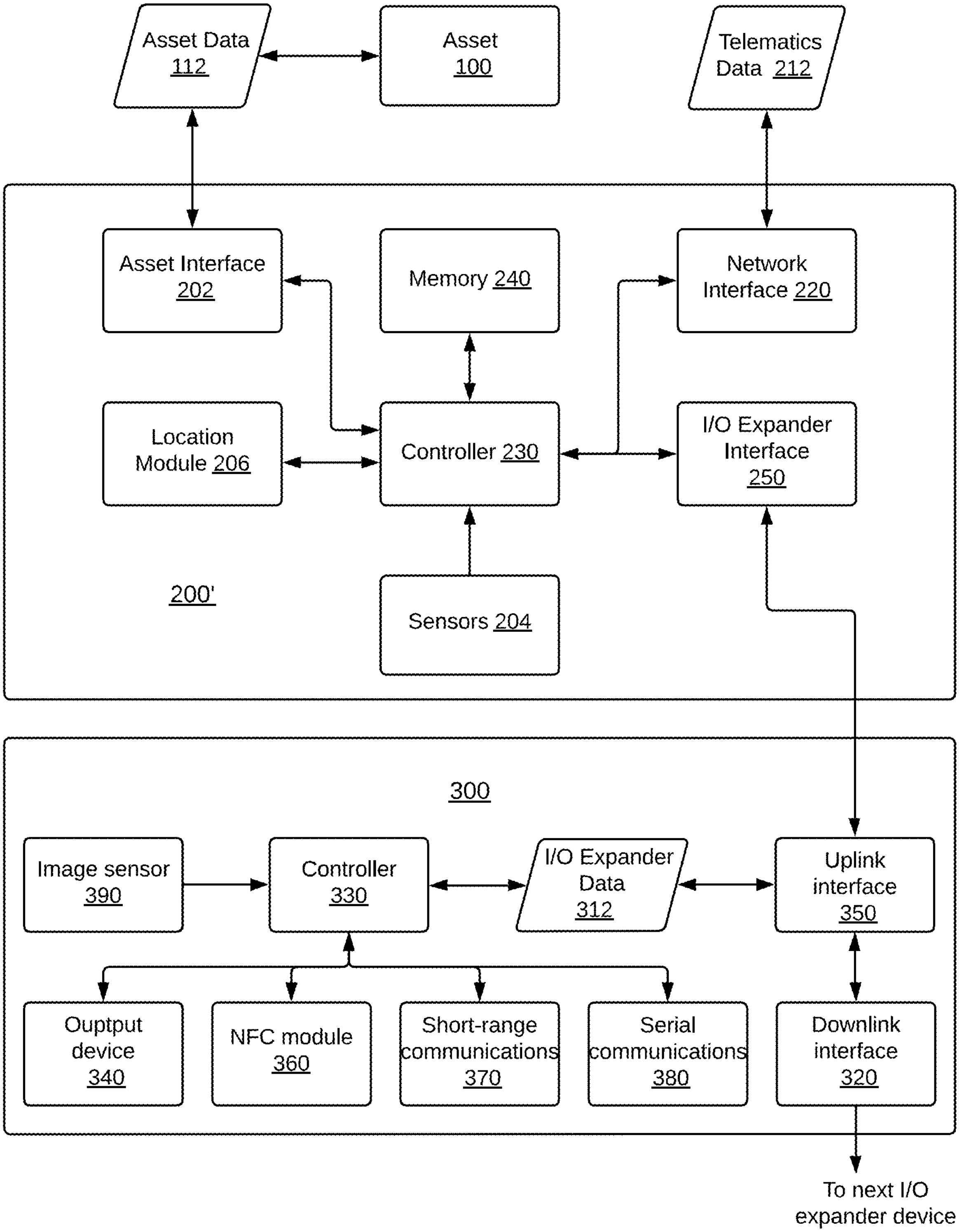
FIG. 3 is a block diagram showing a telematics device coupled to an asset and to an input/output (I/O) expander, in accordance with embodiments of the present disclosure.

To capture and provide information or services not provided by the asset 100 or the telematics device, to produce an output, or to perform an action not supported by the telematics device, the telematics device 200 may be modified to allow an input/output expander device ("I/O expander") to connect thereto, as shown in FIG. 3. FIG. 3 shows a telematics device 200' coupled to an asset 100. An I/O expander 300 is coupled to the telematics device 200'.

The asset 100 is similar to the asset 100 of FIG. 2 and therefore the internal components thereof are not shown in FIG. 3 for simplicity.

The telematics device 200' has a somewhat similar configuration as the telematics device 200 of FIG. 2, but some of the optional components have been removed. Furthermore, the telematics device 200' adds an I/O expander interface 250 for interfacing with the I/O expander 300. The I/O expander interface 250 is coupled to the controller 230 and may be configured for exchanging I/O expander data 312 with the I/O expander 300.

The I/O expander 300 of FIG. 3 is an example I/O expander which is designed to provide additional connectivity options to a telematics device 200, which has more limited features than the one shown in FIG. 2. For example, the telematics device 200' shown in FIG. 3 does not have an NFC module, a short-range wireless communications module, or a serial communications module. Instead, the telematics device 200' has an I/O expander interface 250.

The I/O expander 300 may be an input device configured to capture additional data such as video frames, audio frames, or proprietary signals and provide that data to the telematics device 200'. Alternatively, or additionally, the I/O expander 300 may be configured as an output device and may include a display for displaying information and/or an audio output device for broadcasting messages pertaining to the asset 100.

An I/O expander 300, which connects with the telematics device 200', varies in complexity depending on the purpose thereof. FIG. 3 shows an I/O expander 300 containing several components which may or may not all be present in other I/O expanders. For example, the I/O expander 300 includes a controller 330, an NFC module 260, an output device 340, a short-range communications module 370, an image sensor 390, a serial communications module 380, an uplink interface 350 and a downlink interface 320.

The controller 330 may be similar to the controller 230 of FIG. 3. In some embodiments, the controller 330 is a microcontroller with versatile I/O capabilities. For example, the controller 330 may be a microcontroller which has a plurality of I/O ports such as general-purpose inputs and outputs (GPIOs), serial ports, analog inputs, and the like. In some embodiments, the controller 330 may have built-in persistent memory such as flash memory on which machine-executable programming instructions for conducting the functionality of the I/O expander 300 may be stored. In other embodiments, the controller 330 may be coupled to a persistent memory module (not shown) that contains the machine-executable programming instructions for conducting the functionality of the I/O expander 300. The controller 330 may also have built-in volatile memory, such as random-access memory (RAM) for storing data. Alternatively, the I/O expander 300 may be connected to an external volatile memory for storing data.

The output device 340 receives data from the controller 330 and performs an output function. For example, the output device 340 may include a display for displaying information received from the controller 330. As another example, the output device 340 may include a speech synthesizer and a speaker for displaying audible information received from the controller 330. As yet another example, the output device 340 may be an output interface to a hardware device. For example, the output device 340 may be a motor controller that interfaces to an electric motor.

The NFC module 360, short-range communications module 370, and the serial communications module 380 are similar to the NFC module 260, short-range wireless communications module 270, and the serial communications module 280 described above with reference to FIG. 2.

The image sensor 390 may be a digital still camera or a digital video camera capable of capturing images. For example, the image sensor 390 may be a road-facing dashboard camera for monitoring the road ahead. In other examples, the image sensor 390 may be a driver-facing dashboard camera for identifying the operator 10 and/or their condition.

The uplink interface 350 is an electronic peripheral interface coupled to the controller 330 and is used to provide data exchange and/or power capabilities to the I/O expander 300. The uplink interface 350 allows the I/O expander 300 to transmit and receive I/O expander data. The uplink interface 350 is configured to use the same protocol and signaling as the I/O expander interface 250 of the telematics device 200'. Accordingly, the I/O expander 300 may exchange the I/O expander data with the telematics device 200'. In some embodiments, the uplink interface 350 may also include power pins connected to corresponding power pins in the I/O expander interface 250, thus allowing the I/O expander 300 to be powered via the telematics device 200'. In other embodiments (not shown), the I/O expander 300 may have its own power source instead of or in addition to the power provided by the telematics device 200' via the uplink interface 350.

The downlink interface 320 is an electronic peripheral interface coupled to the uplink interface 350. The downlink interface 320 is configured to interface with the uplink interface 350 of another I/O expander 300 (as will be described below). Allowing the uplink interface 350 to connect to the downlink interface 320 of another I/O expander 300 allows the daisy chaining of I/O expanders 300.

Integrated Telematics Device

Figure 4:
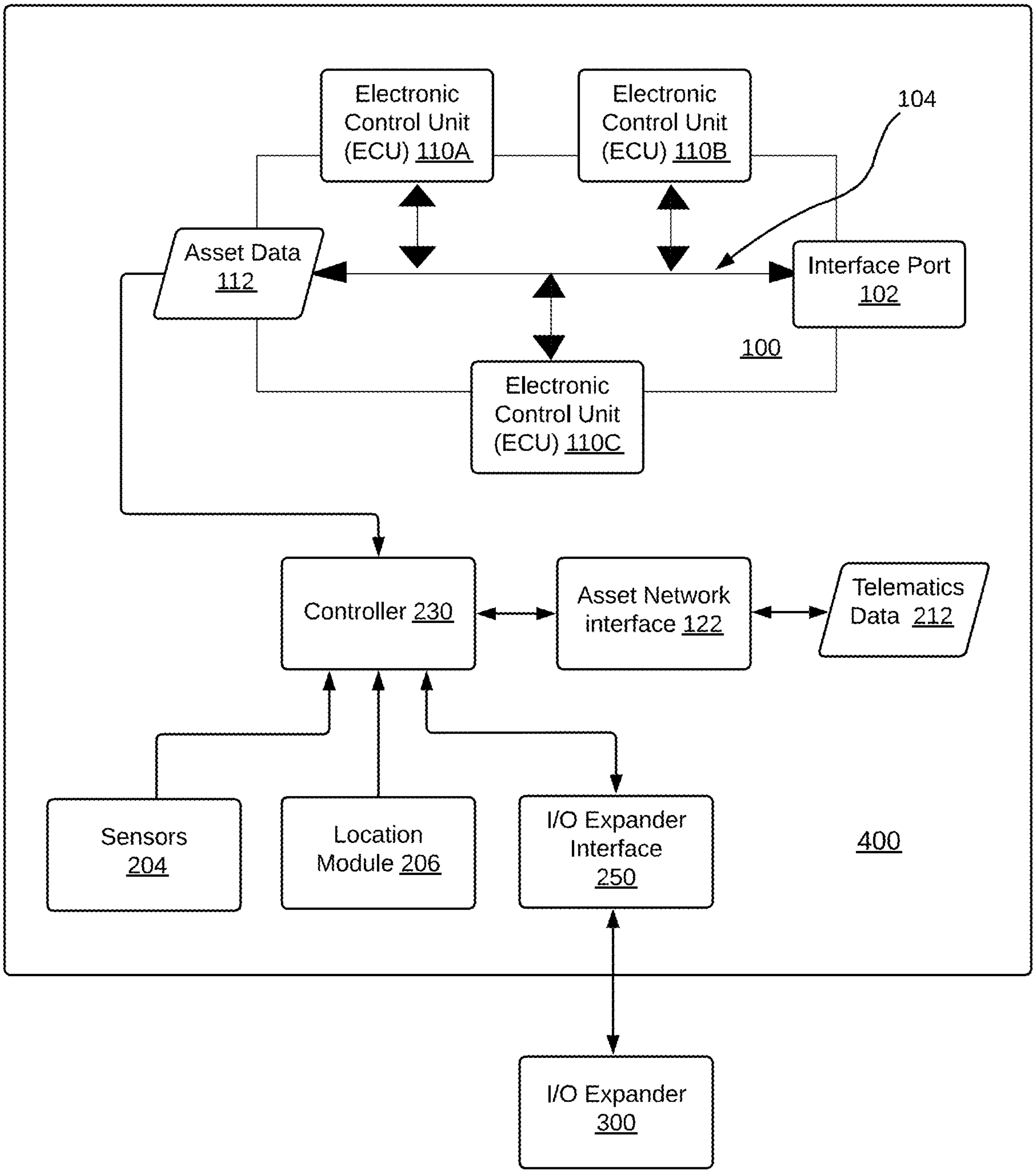
FIG. 4 is a block diagram showing an asset having a telematics device integrated therein and I/O expander coupled thereto, in accordance with embodiments of the present disclosure.

In the above-mentioned figures, a telematics device is shown as a separate entity connected with a corresponding asset. The telematics device, however, may have its components integrated into the asset 100 at the time of manufacture of the asset 100. This may be the case when the asset 100 is a connected car having an asset network interface. For example, with reference to FIG. 4, there is shown an asset 400 with the components of a telematics device integrated therein, in accordance with embodiments of the present disclosure. The asset 400 is similar to the asset 100 but, being a connected asset such as a connected car, it has an asset network interface 122. In the depicted embodiment, the controller 230 is directly connected to the asset communications bus, which is a CAN bus 104 and may directly obtain the asset data 112 therefrom. The sensors 204 and the location module 206 are also integrated into the asset 100 and provide the sensor data 205 and the location data 207 to the controller 230 as described above. The asset network interface 122 belongs to the asset 400 and may be used by the asset 400 to communicate with an original equipment manufacturer (OEM) server, to a roadside assistance server, or for other purposes. The controller 230 may utilize the asset network interface 122 for the transmission of telematics data 212 provided by the controller 230. In order to support further not provided by the integrated peripherals such as the sensors 204 and the location module 206, the asset has an I/O expander interface 250 coupled to the controller 230 so that an I/O expander 300 may be connected to the asset 400 therethrough. The asset 400 may have an interface port 102 for connecting other devices other than a telematics device 200, such as a diagnostic tool including, but not limited to, an OBD-II reader device.

Asset Tracking Devices

Figure 5:
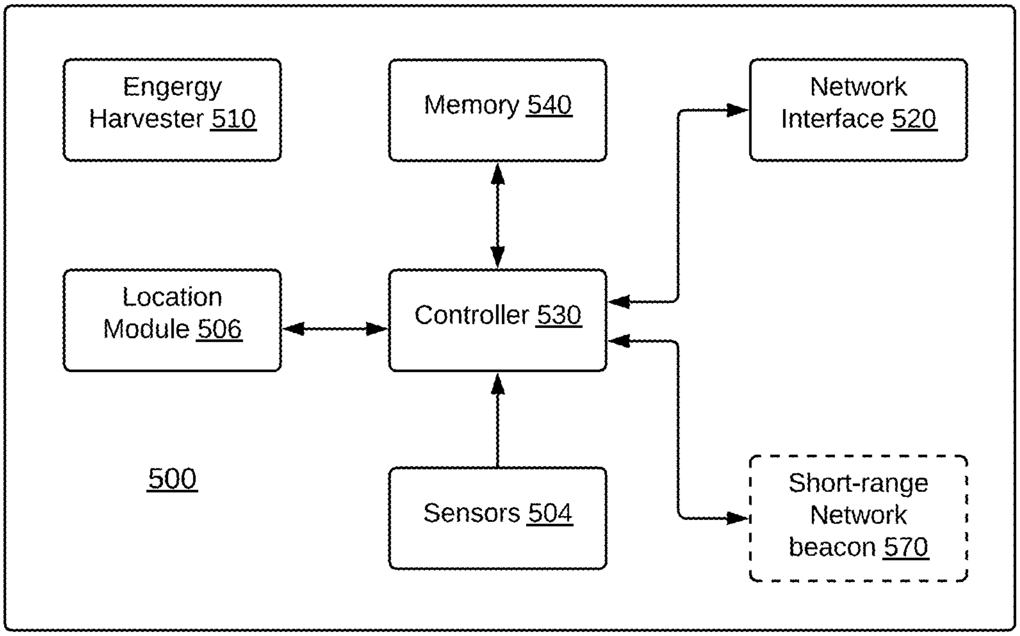
FIG. 5 is a block diagram showing an asset tracker, in accordance with embodiments of the present disclosure.

A telematics device 200 as described above is suitable for tracking both the location and operating status of vehicles containing an engine and powertrain. Sometimes the asset being tracked is an engineless asset, such as a trailer, a shipping container, or a train wagon. In this disclosure, a "truck" or a "tractor" is a vehicle powered by an engine and driven by a person, such as the operator 10. A tractor or a truck is an example of a vehicle. A "trailer" is a mobile cargo space that is designed to be pulled by a separate vehicle. A trailer is an example of an engineless vehicle. A "tractor trailer," a "transport truck" or an "18 wheeler" refers to the combination of a truck (or "tractor") and a trailer. Tracking a trailer may be done by using an asset tracker. Since the trailer does not have an engine, the design of an asset tracker is slightly different from the design of a telematics device 200. FIG. 5 is a block diagram of an asset tracker 500, in accordance with embodiments of the present disclosure.

The asset tracker 500 is comprised of a controller 530, a memory 540, sensors 504, a network interface 520, a location module 506, an energy harvester 510, and optionally a short-range network beacon module 570 (shown in dotted lines).

The controller 530, memory 540, sensors 504, network interface 520, and location module 506 are similar to the controller 230, memory 240, sensors 204, network interface 220, and location module 206 discussed above.

The energy harvester 510 may be a battery, a super capacitor, or a solar panel. In this context, the asset tracker 500 is not connected to an external power source and therefore the battery or super capacitor cannot be charged when the asset tracker 500 is deployed in a trailer, for example. Accordingly, the battery or super capacitor comprise a non-replenishable energy harvester. A solar panel is a replenishable energy harvester during the day and is non-replenishable during the night.

The short-range network beacon module 570 is an optional component of the asset tracker. The short-range network beacon module 570 may be a wireless beacon such as a Bluetooth or a Wi-Fi beacon that may be activated to send wireless beacon signals that can be detected by the telematics device.

In operation, the asset tracker 500 implements a power-saving scheme whereby the various components thereof are put into sleep or low-power mode. Periodically, such as every 15 minutes, the asset tracker 500 wakes up, reads location data from the location module 506 and sends said location data over the network interface 520 to the telematics server 130. In some embodiments, the sensors 504 may capture sensor data including ambient conditions such as temperature, pressure, and the like. The sensor data may also be sent with the location data when the asset tracker 500 wakes up. As discussed earlier, the network interface 520 may be a cellular modem. Cellular modems has a high power consumption due to their need to communicate with cellular base stations. Accordingly, the asset tracker 500 is designed to limit powering up the cellular modem and transmitting data where possible. The sleep duration between two successive wakeups of the asset tracker may in some cases be longer than 15 minutes, such as 30 minutes, 1 hour, or even more.

Trucks and trailers generally have a temporary association. A truck may disconnect one trailer and connect another trailer thereto at a shipping yard, for example. Monitoring a truck is different from monitoring a trailer. Monitoring a truck is best done by a telematics device that captures asset data 112, sensor data 205, and location data 207. Monitoring a trailer, however, only requires monitoring asset tracking data comprised of location data and sensor data so it is best done by an asset tracker. Asset trackers have a simpler design, lower cost, and can be deployed in any location on the trailer as they do not need to connect to an interface port.

Figure 6:
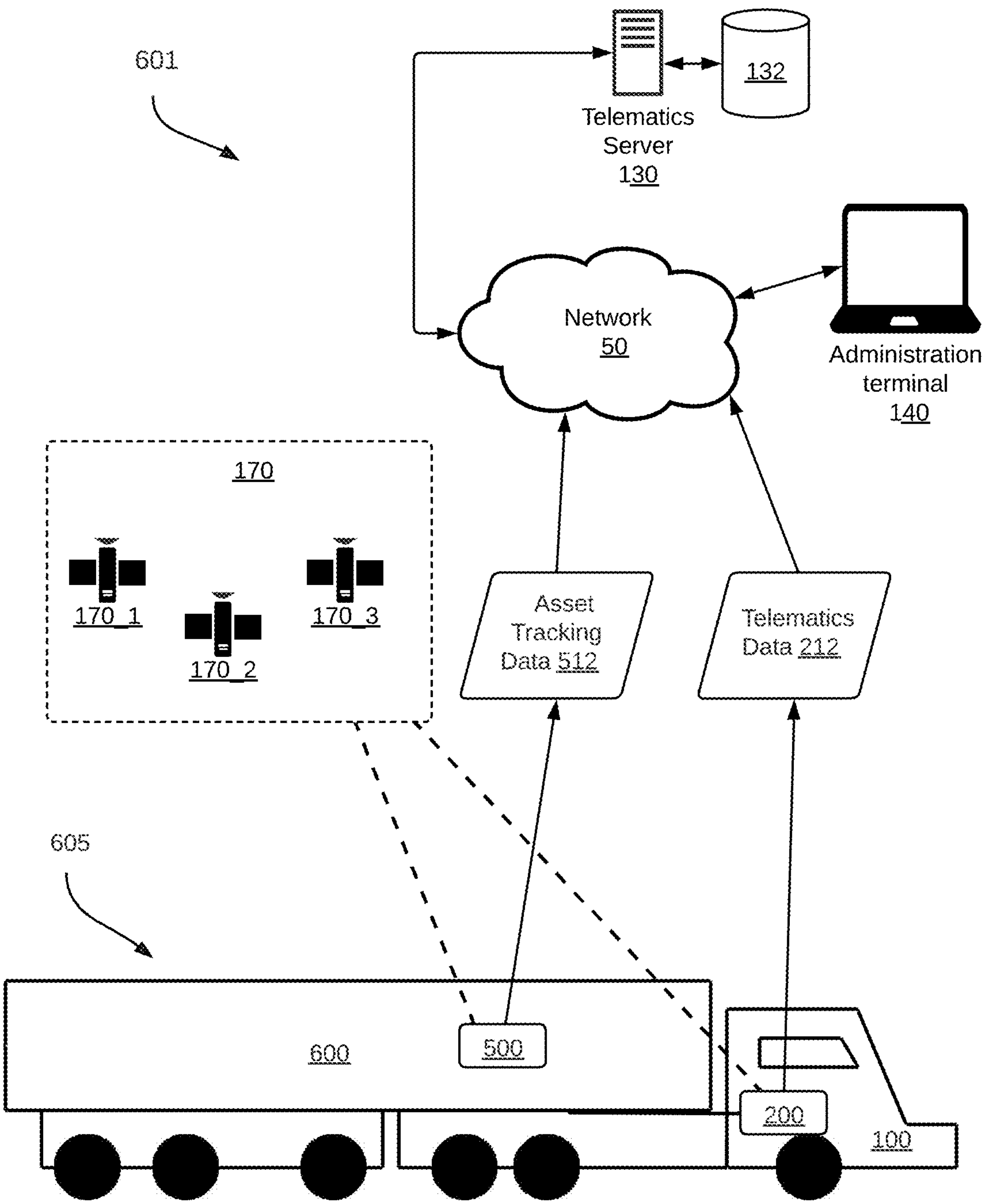
FIG. 6 a schematic diagram of a telematics system including a telematics device coupled to a truck, and an asset tracker coupled to a trailer, in accordance with embodiments of the present disclosure.

FIG. 6 depicts a telematics system 601, similar to the telematics system 101 used to illustrate the operation of both a telematics device 200 and an asset tracker 500. The telematics system 601 includes satellites 170, a telematics server 130, a telematics database 132, and an administration terminal 140 as discussed above with reference to the telematics system 101. Other components of the telematics system 101 are not shown for brevity. The telematics system 601 may contain many assets 100 and operator terminals 150, for example.

The telematics system 601 is shown including a transport truck 605 comprised of a tractor 100 and a trailer 600. A telematics device 200 is deployed in the tractor 100 while an asset tracker 500 is deployed in the trailer 600. The telematics device 200 gathers and sends telematics data 212 to the telematics server over the network 50. The asset tracker 500 sends asset tracking data 512 to the telematics server 130 over the network 50.

Figure 7:
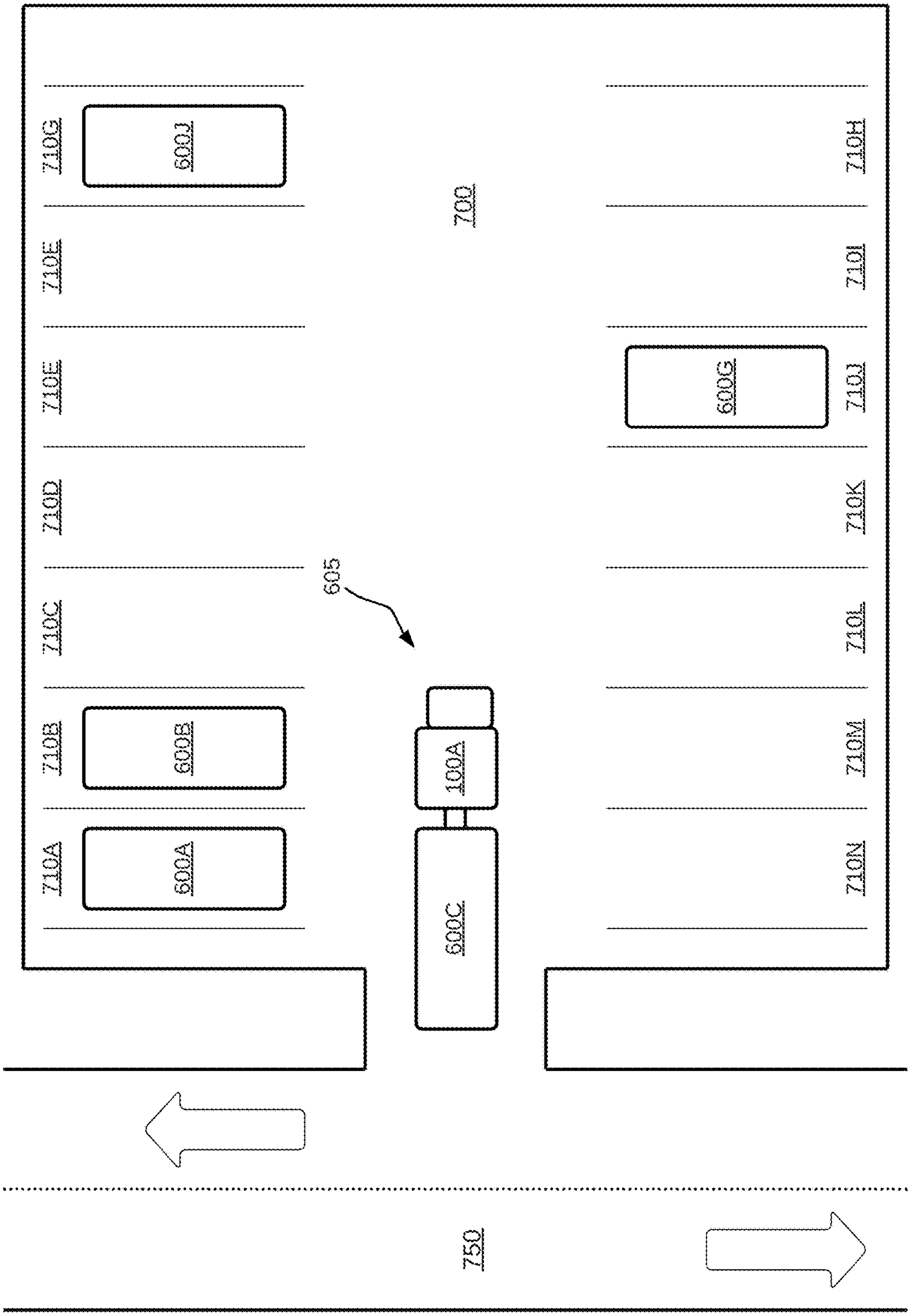
FIG. 7 is a schematic diagram depicting a transport truck arriving at a shipping yard in which a plurality of trailers are parked.
Figure 8:
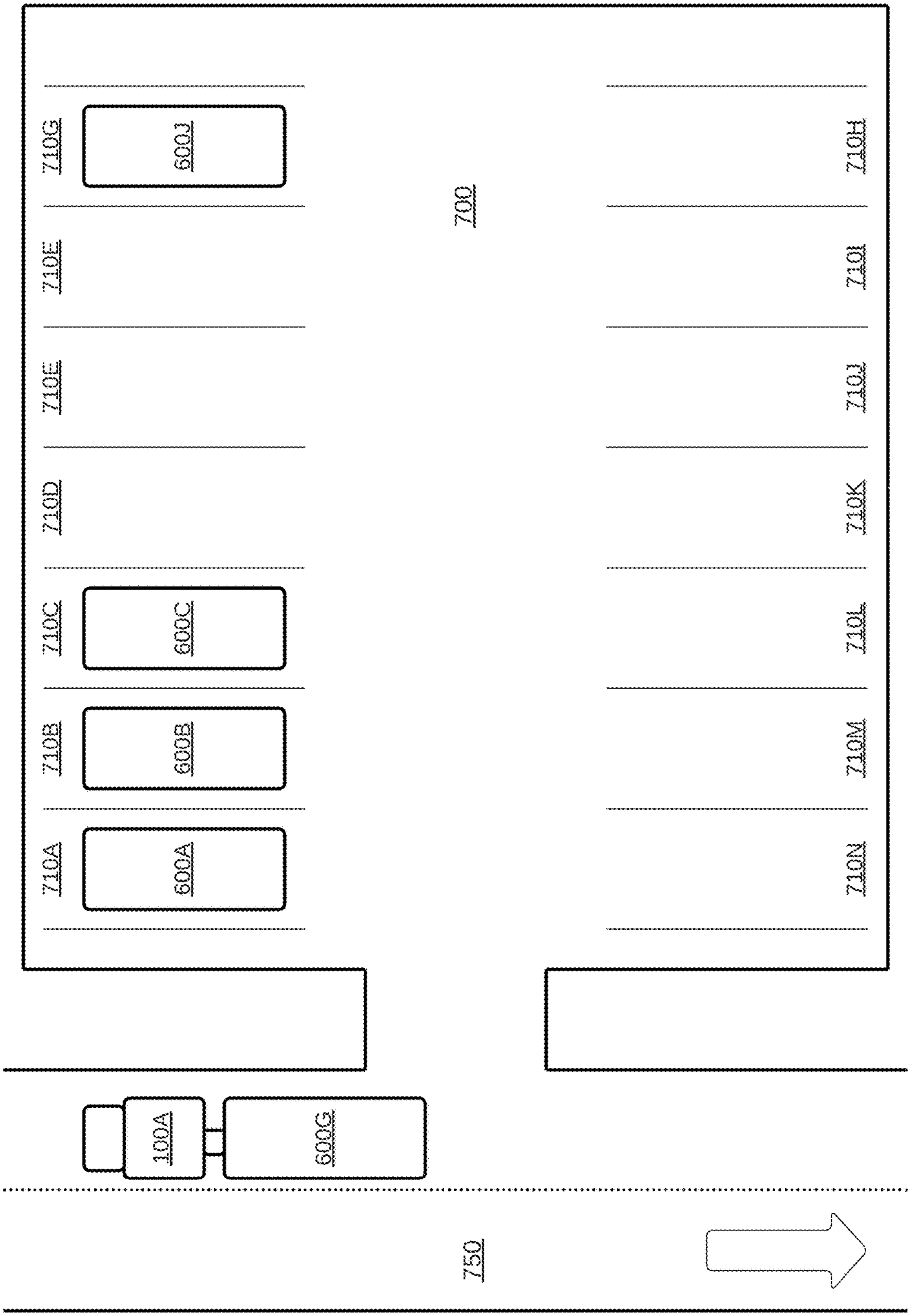
FIG. 8 is a schematic diagram depicting a transport truck leaving the shipping yard of FIG. 7 after having connected the wrong trailer thereto.

Tractors and trailers are interchangeable. At any location, such as a shipping yard, a tractor may release a trailer connected thereto and connect another trailer thereto before starting a new trip. For example, with reference to FIG. 7, there is shown a shipping yard 700 comprised of a plurality of parking spots 710A, 710B, 710C, 710D, 710E, 710F, 710G, 710H, 710I, 710J, 710K, 710L, 710M, and 710N. A plurality of trailers may park the respective parking spots. In the depicted example, the parking spots 710A, 7108, and 710J have trailers parked therein. The transport truck 605 has arrived from the road 750 to the shipping yard 700. The transport truck 605 is comprised of the tractor 100A and the trailer 600C. The operator of the tractor 100A intends to drop off the trailer 600C, in the parking spot 710C, and pick up the trailer 600J from the parking spot 710J. However, the spot 710J has the trailer 600G instead of the trailer 600J. Similarly, the spot 710G has the trailer 600J instead of the trailer 600G. The operator of the tractor 100A may not be able to identify the trailer parked in the parking spot 710J as the trailer 600G. As a result, as shown in FIG. 8, the tractor 100A is now towing the trailer 600G instead of 600J. In this case the trailer 600G is the wrong trailer. It is desirable to identify when a situation such as the one shown arises. It is particularly desirable to determine when a tractor is towing the wrong trailer. It is further desirable to determine when a tractor is towing the wrong trailer within a short distance and/or time of leaving a particular location such as a shipping yard.

In order to determine when a tractor has towed the wrong trailer, the location of each of the tractor and the trailer are compared by the telematics server 130. A tractor and a trailer that report substantially the same location a plurality of times as they are moving are deemed to be moving together. Since the trailer is engineless, the trailer is assumed to be towed by the tractor. Accordingly, the telematics server 130 may compare a plurality of locations received from a telematics device 200 deployed in a tractor 100, with a corresponding plurality of locations received from an asset tracker 500 deployed in a trailer. Locations reported by the asset tracker are matched against locations reported by the telematics device using a time stamp associated with teach location. For example, if the telematics device 200 reports the location data 207 every 10 seconds and the asset tracker 500 reports the location thereof every 1 minute, then the telematics server 130 searches through the location data 207 reported by the telematics device 200 and compares the location with the closest time stamp to the time stamp of the location reported by the asset tracker 500. A single location may not be sufficient to make a determination that a trailer is travelling with a tractor. For example, it is possible for two transport trucks to leave a shipping yard at substantially the same time or to be travelling side by side momentarily. Accordingly, a plurality of location matches between the location data reported by the telematics device and the asset tracker, while both the asset tracker and the telematics device are in motion are a good determining factor that both the tractor and the trailer are traveling together (i.e., that the trailer is being towed by the tractor).

As discussed above, some asset trackers have an energy harvester 510 in the form of a supercapacitor or a battery and as such has limited energy. On such asset trackers waking up frequently to report location data to the telematics server 130 will deplete the energy stored in the energy harvester 510. If the energy harvester 510 is a solar panel and the transport truck is traveling at night, there is also a risk that the energy may be depleted if the asset tracker is waking up frequently to send location data to the telematics server 130.

Figure 9:
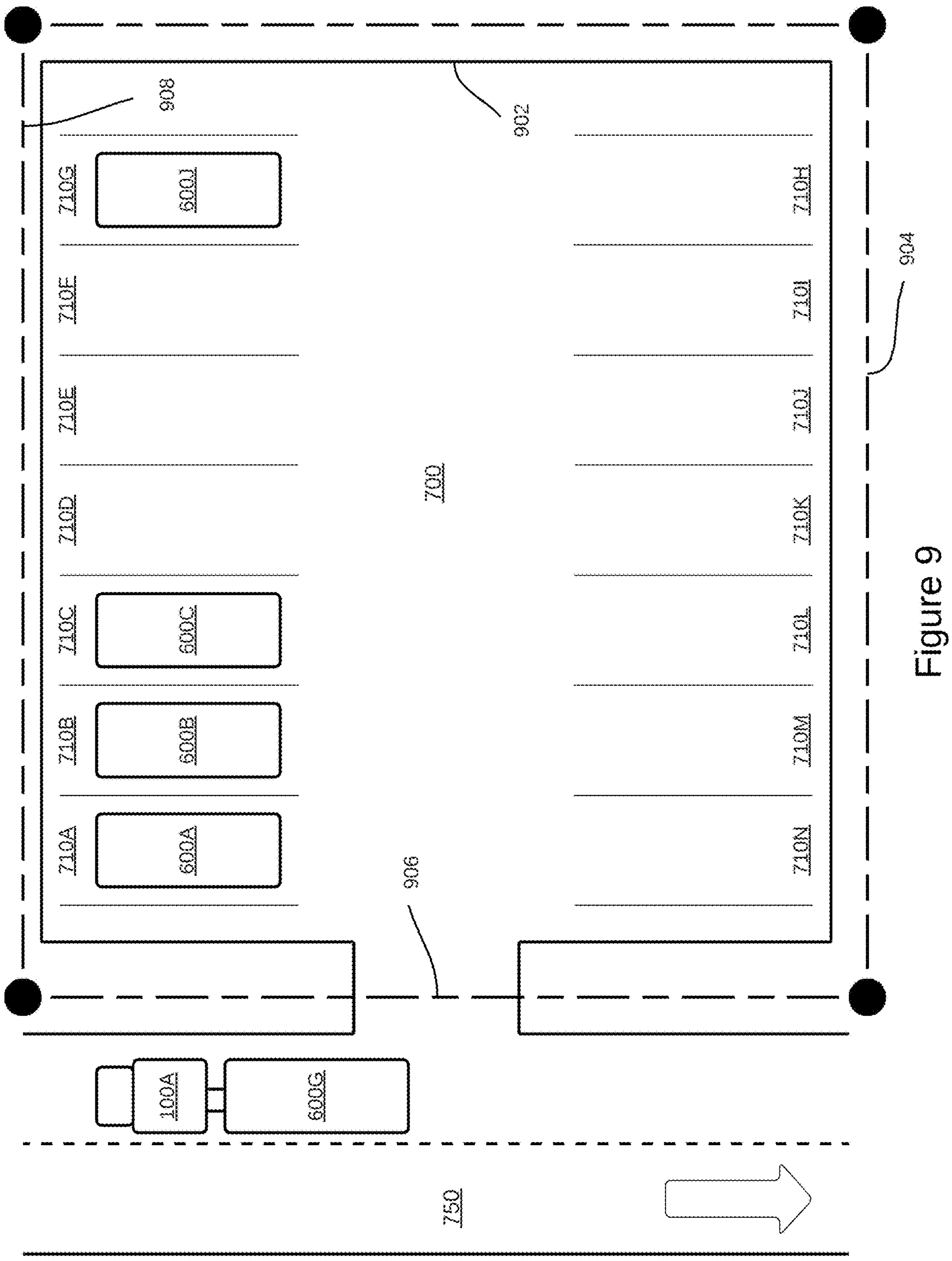
FIG. 9 is a schematic diagram of the shipping yard and transport truck of FIG. 8, wherein a geographic zone has been created around the shipping yard, in accordance with embodiments of the present disclosure.

In this disclosure, methods and systems for detecting an association (or co-location) between a tractor and a trailer without depleting an energy harvester 510 of an asset tracker 500 are proposed. In this disclosure, a line on a map between a first point and a second point that can generate a notification or a signal when crossed by an asset tracker is referred to as a tripwire. With reference to FIG. 9, there is shown a map of a shipping yard 700 around which a geofence has been defined. The geofence is in the form of a rectangle having the tripwires 902, 904, 906 and 908 forming the sides thereof. The asset tracker 500 is able to detect when the trailer 600G to which it is coupled has crossed the tripwire 906 of the geofence. The asset tracker 500 is capable of detecting when a tripwire has been crossed. In response to detecting crossing the tripwire, the asset tracker 500 is switched into a location reporting mode with a short sleep duration between successive wakeups. In the location reporting mode, the asset tracker 500 wakes up frequently, such as every 30 seconds to obtain and send location data to the telematics server 130. The telematics server 130 compares the location data with location data from telematics devices and determines an association between the trailer containing the asset tracker 500 and a vehicle to which a telematics device having substantially similar location data is coupled.

When the asset tracker 500 is in a normal operating mode, it cycles between wakeup and sleep as discussed. In some embodiments, the asset tracker 500 is not in a full sleep mode between wakeups. In such embodiments, when in sleep mode, the asset tracker powers down the network interface 520 and the sensors 504, but reads location data from the location module 506. As such, the asset tracker 500 may detect whether the trailer to which the asset tracker is coupled has crossed a tripwire 906 on FIG. 6 which the trailer 600G would have crossed upon exiting from the shipping yard 700 to the road 750. In such embodiments, this may be possible as the location module 506 consumes significantly less electric power than the network interface 520 and performing a comparison between the location provided by the location module 506 and the tripwire 906 may be done even when the controller 530 is operating at a slow clock speed. In such embodiments, there are two modes of operation of the asset tracker: a normal operating mode and a location reporting mode, as shown in FIG. 10A.

Figure 10A:
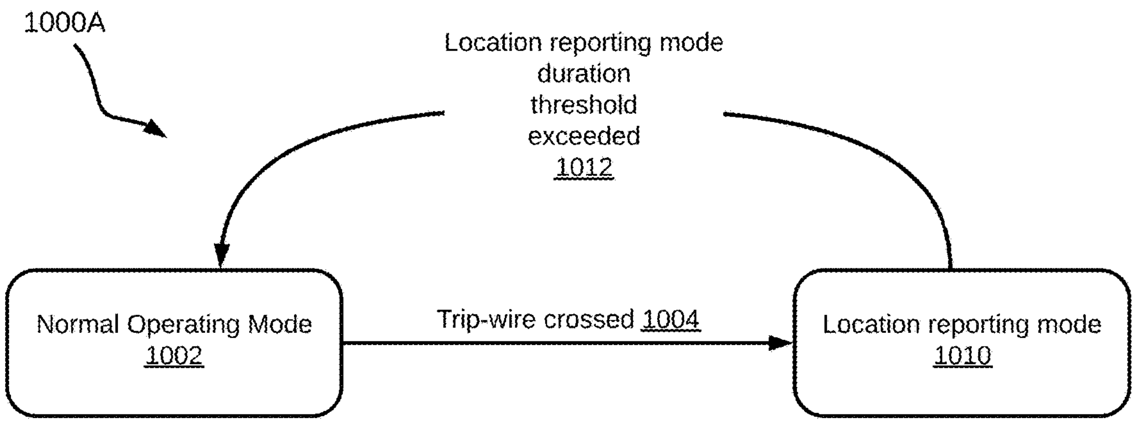
FIG. 10A is state diagram illustrating operating modes of the asset tracker of FIG. 5, in accordance with embodiments of the present disclosure.

With reference to FIG. 10A, there is shown a state diagram 1000A depicting the two modes of operation, in accordance with embodiments of the present disclosure. The asset tracker runs in a normal operating mode 1002 in which tripwire detection is enabled. In normal operation mode 1002, the asset tracker reads the location data from the location module 506 and checks for tripwire crossing. If no tripwire is crossed, the asset tracker waits until the sleep duration expires and then wakes up and reports location data to the telematics server 130. For example, the asset tracker may only power up the network interface 520 once every 30 minutes. Upon detecting that a tripwire has been crossed 1004, the asset tracker transitions to a location reporting mode 1010. In the location reporting mode 1010, the asset tracker powers up the network interface 520, obtains the asset tracker location from the location module 506, and sends the asset tracker location to the telematics server 130 more frequently, such as every 1 minute or every 30 seconds. As a result, a plurality of asset tracker locations are provided to the telematics server 130 while the asset tracker is in the location reporting mode 1010. After being in the location reporting mode 1010 for a duration that exceeds a location reporting mode duration threshold, the asset tracker transitions back to the normal operating mode as shown with reference to the transition 1012.

Figure 10B:
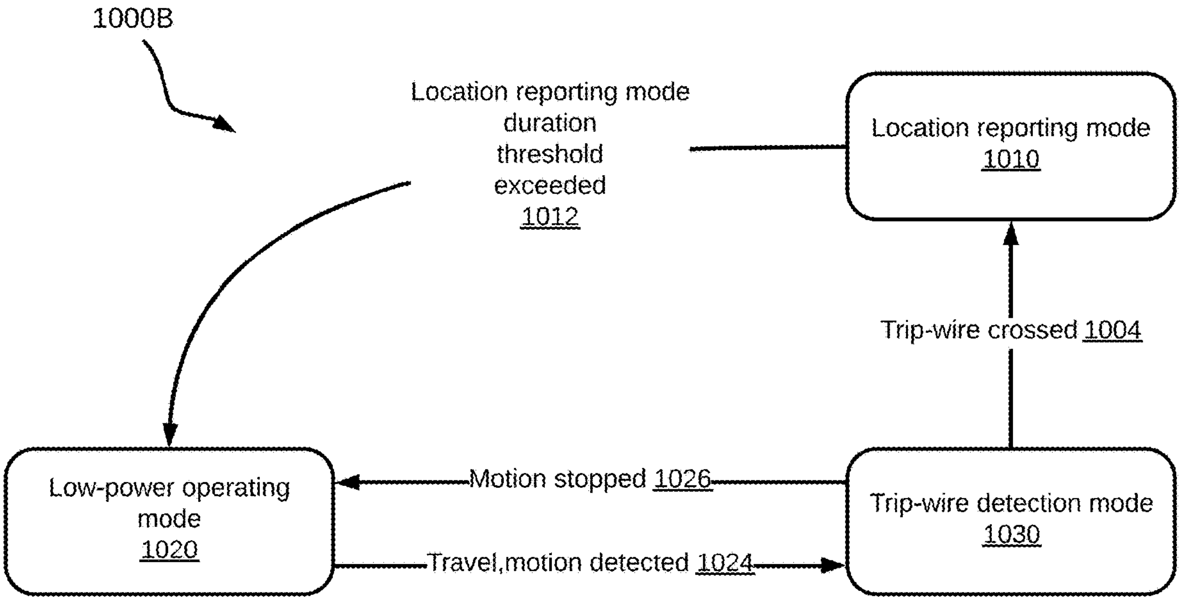
FIG. 10B is a state diagram illustrating operating modes of the asset tracker of FIG. 5, in accordance with other embodiments of the present disclosure.

In some embodiments, the asset tracker 500 has three operating modes: a low-power operating mode 1020, a tripwire detection mode 1030, and a location reporting mode 1010, as shown in the state diagram 1000B shown in FIG. 10B. In the low-power operating mode, both the location module 506 and the network interface 520 are powered down while in sleep mode between two successive wakeups. The asset tracker 500 may wake up only every 30 minutes, power up the network interface 520 and the location module 506, obtain the asset tracker location from the location module 506, and send the location data to the telematics server via the network interface 520. While in sleep mode, the asset tracker 500 may be configured to wakeup if the sensors 504 comprise motion sensors and they report motion consistent with the trailer in which the asset tracker is deployed being in travel mode. For example, the asset tracker 500 may configure motion sensors, such as accelerometers, to produce a signal to the controller 530, whenever the asset tracker 500 detects motion that is above a particular motion threshold. For example, the sensors 504 may comprise a 3-axis accelerometer which may be configured to generate a hardware interrupt signal to the controller 530 whenever the 3-axis accelerometer detects an acceleration that is greater than a particular threshold. The controller 530 may read acceleration values for a particular duration to ascertain whether the acceleration values indicate motion travel of the trailer in which the asset tracker is disposed or installed. The acceleration value may indicate motion travel if they are along the longitudinal axis of the trailer in which the asset tracker is installed. The acceleration values may also indicate motion travel if they are in a particular direction for a duration of time. In response to detecting travel motion 1024, the asset tracker transitions into a tripwire detection mode 1030. In the tripwire detection mode 1030, the asset tracker powers up the location module 506 and periodically checks whether the location thereof crosses a tripwire, such as the tripwire 906.

While in the tripwire detection mode 1030, if the sensor 504 report that the motion has stopped 1026, i.e., that the vehicle in which the asset tracker is deployed becomes stationary, then the asset tracker 500 transitions back to the low-power operating mode. If, however, the asset tracker 500 determines that a tripwire has been crossed 1004, the asset tracker transitions into the location reporting mode 1010 as discussed above. Similarly, when the location reporting mode duration threshold has been exceeded as in the transition 1012, the asset tracker 500 transitions into the low-power operating mode 1020.

In some embodiments, instead of a location reporting mode duration threshold, the asset tracker is configured to report the location thereof a finite number of times, such as three times or 5 times at specific intervals. After the asset tracker reports the location the specific number of times, the asset tracker reverts back to the normal operating mode 1002 (for the embodiment of FIG. 10A) or to the low-power operating mode 1020 (for the embodiment of FIG. 10B).

Figure 11A:
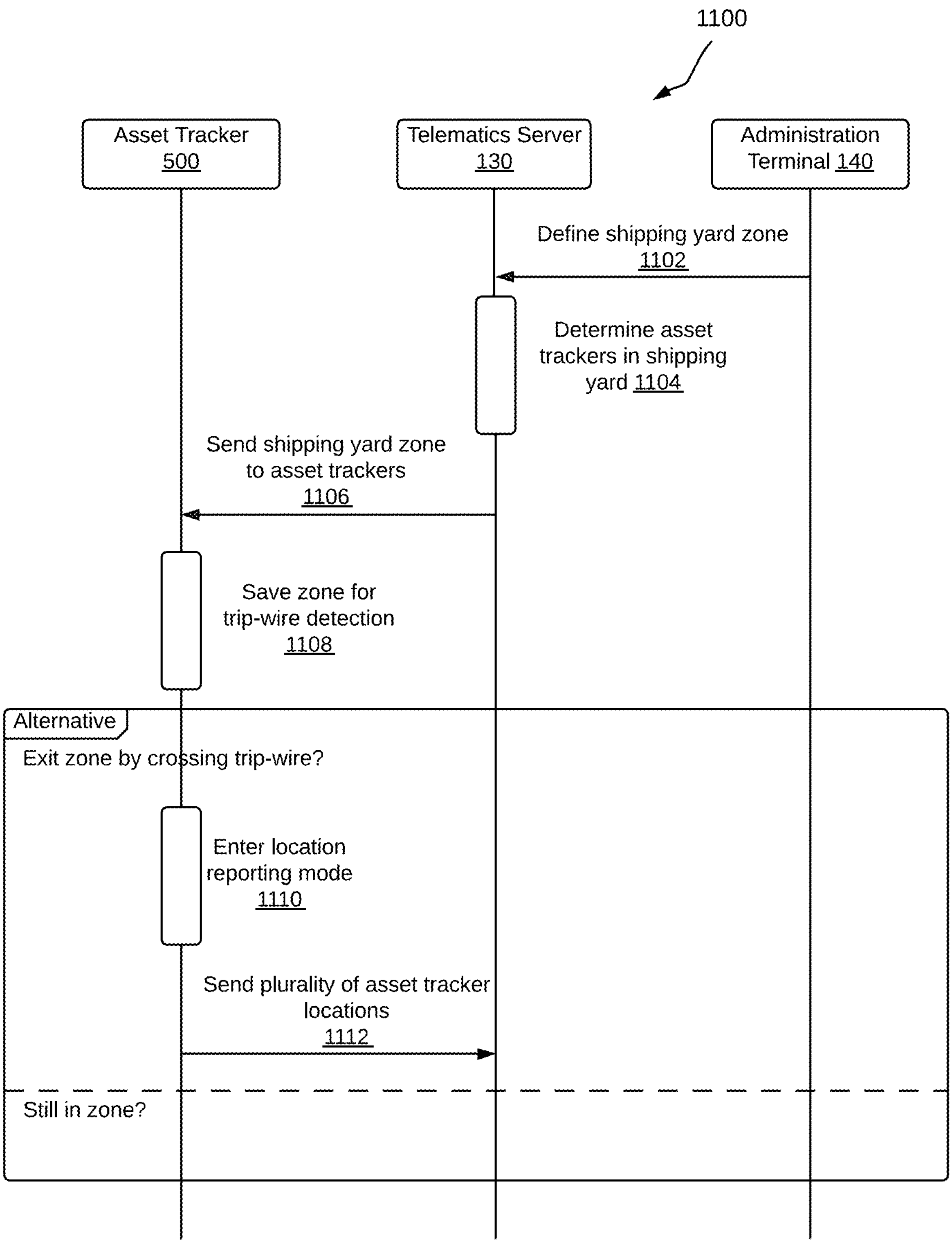
FIG. 11A is a message sequence diagram illustrating a method for triggering location reporting mode in an asset tracker, in accordance with embodiments of the present disclosure.

The zone defined by the tripwires 902, 904, 906 and 908 may be defined at the telematics server 130 by a fleet manager 20 through an administration terminal 140. FIG. 11A depicts part of a method 1100 for obtaining a plurality of locations of an asset tracker 500, in accordance with embodiments of the present disclosure.

At step 1102, a fleet manager 20 may use an administration terminal 140 to define a shipping yard zone on the telematics server 130. The shipping yard zone may be defined using a graphical interface or by entering geographical coordinates in a text interface.

At step 1104, in response to receiving the zone definition of the shipping yard, the telematics server 130, determines the asset trackers 500 located within the zone. A trailer parked within the shipping yard defined by the zone will have had its asset tracker report the location thereof earlier to the telematics server 130. The telematics server 130 may have saved the location for each of the asset trackers in the telematics database 132 or another database. Accordingly, the telematics server 130 may query the telematics database 132 and compare the locations of asset trackers therein to determine the asset trackers currently within the zone. An asset tracker may be stored in the telematics database 132 and identified by an asset tracker identifier.

At step 1106, the telematics server 130 sends the zone definition to the asset trackers 500 which are currently within that zone. The zone definition is formed of a plurality of tripwires forming a polygon.

At step 1108, the asset tracker 500 saves the zone definition for use in tripwire detection. In some embodiments, the tripwire detection may be enabled by default, while in other embodiments tripwire detection is only enabled in response to motion detection consistent with travel ("travel motion"). The asset tracker 500 is determined to have crossed a tripwire if the asset tracker crosses one tripwire of the plurality of tripwires of the zone definition.

If the asset tracker exits the zone by crossing one of the tripwires, then the asset tracker enters location reporting mode 1110. At step 1112, while the asset tracker is in the location reporting mode 1110, the asset tracker sends a plurality of locations thereof to the telematics server 130.

Figure 11B:
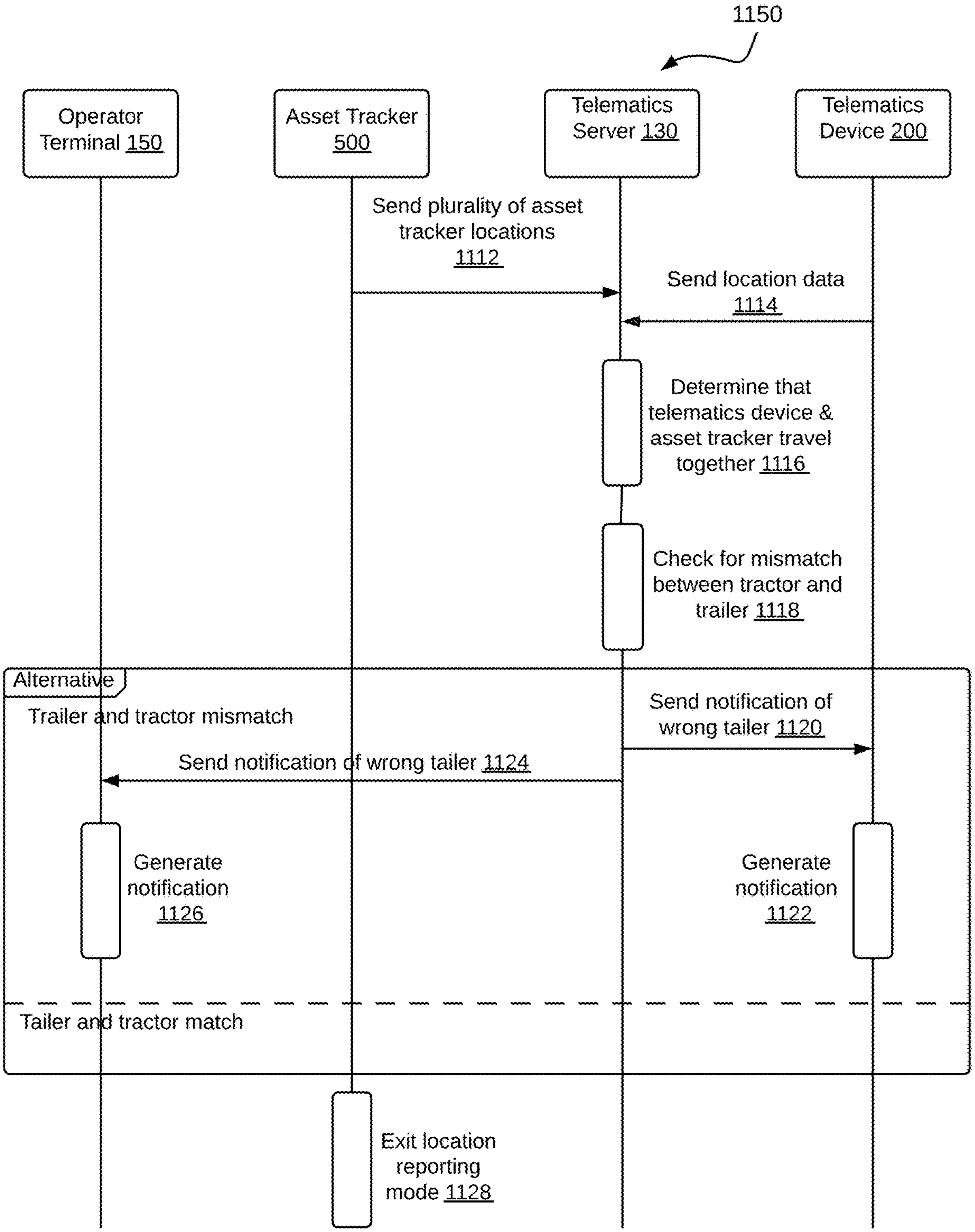
FIG. 11B is a message sequence diagram illustrating a method for determining whether a telematics device and an asset tracker are travelling together, in accordance with embodiments of the present disclosure.

FIG. 11B builds on the method 1100 of FIG. 11A. The method 1150 is depicted starting with the step 1112 (duplicated from FIG. 11A for clarity), wherein the asset tracker sends a plurality of locations thereof to the telematics server 130. The plurality of locations reported by the asset tracker may be spaced in time by short durations such as a few seconds.

At step 1114 the telematics device 200 sends location data 207 to the telematics server 130. The telematics device 200 may send location data 207 every second or every few seconds. While the step 1114 is depicted to take place after step 1112, this is not necessarily the case. Both the telematics device 200 and the asset tracker 500 may send location data concurrently to the telematics server 130.

At step 1116, the telematics server 130 determines that the telematics device 200 and the asset tracker 500 are tracking together. In some embodiments, the telematics server 130 compares a first plurality of locations reported by the telematics device 200 and a second plurality of locations reported by the asset tracker 500. In the comparison, locations having substantially the same time stamp are compared. The telematics server 130 may compute the distance between a location of the telematics device 200 and a location of the asset tracker 500 having substantially the same time stamp. If the distance between the asset tracker 500 and the telematics device 200 is substantially the same over a plurality of location readings, then the telematics server 130 determines that the telematics device 200 and the asset tracker 500 are travelling together. Consequently, the telematics server determines that the tractor 100A to which the telematics device 200 is coupled, and the trailer 600G to which the asset tracker 500 is coupled are travelling together.

At step 1118 the telematics server checks for a mismatch between the tractor 100 and the trailer 600. The telematics server 130 may query the telematics database 132 using a telematics device identifier of the telematics device coupled to the tractor 100. Querying the telematics database 132 may result in obtaining the asset tracker identifier of the trailer 600 which is supposed to be connected to the tractor 100. Using association information between the telematics device 200 and the asset tracker 500, the telematics server 130 can verify that the tractor 100 to which the telematics device 200 is coupled and the trailer 600 in which the asset tracker 500 is installed are expected to be travelling together. If there is a tractor and trailer mismatch, then control goes to step 1120.

At step 1120, the telematics server 130 sends a notification to the telematics device 200. The notification may be a wrong trailer notification notifying the telematics device 200 that the tractor 100 to which the telematics device 200 is coupled is currently towing the wrong trailer.

At step 1122, the telematics device 200 may generate a notification indicating that the wrong trailer is currently being towed by the tractor 100 to which the telematics device 200 is coupled. For example, the telematics device 200 may beep a number of times, display an error message on a display coupled thereto, or play an audio message to the effect that a trailer mismatch has been detected.

At step 1124, the telematics server 130 sends a notification to an operator terminal 150 of the operator driving the tractor 100 to which the telematics device 200 is coupled. The notification sent indicates to the operator terminal that the wrong trailer is being towed by the tractor 100 driven by the operator 10 using the operator terminal 150. For example, the telematics server 130 may query the telematics database 132 and determine the identity of the operator 10 and an identifier of an operator terminal 150 of the operator 10, who is registered to be driving the tractor 100A to which the telematics device 200 is coupled.

At step 1126, in response to receiving the notification of a wrong trailer or a trailer mismatch, the operator terminal 150 generates a notification to the operator 10. The notification may be in the form of a message displayed on a display of the operator terminal, an audible message played over a speaker of the operator terminal, or a beep.

At 1128, the asset tracker 500 exits the location reporting mode 1128 in order to save power consumed thereby from the energy harvester 510. Exiting the location reporting mode may be in response to exceeding the location reporting mode duration threshold. The asset tracker 500 may return to a normal operating mode 1002 as discussed with reference to FIG. 10A. Alternatively, the asset tracker 500 may return to a low-power operating mode 1020 as discussed with reference to FIG. 10B.

Embodiments have been described where the techniques are implemented in circuitry and/or computer-executable instructions. It should be appreciated that some embodiments may be in the form of a method or process, of which at least one example has been provided. The acts performed as part of the method or process may be ordered in any suitable way. Accordingly, embodiments may be constructed in which acts are performed in an order different than illustrated, which may include performing some acts simultaneously, even though shown as sequential acts in illustrative embodiments. Various aspects of the embodiments described above may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

The invention claimed is:

1. A method in an asset tracker deployed in an engineless vehicle, the asset tracker comprising a location module and a network interface, the method comprising:

receiving, from a telematics server, a zone definition comprised of a plurality of tripwires;

operating the asset tracker in low-power mode in which both the location module and the network interface are powered down;

detecting a travel motion of the asset tracker;

operating the asset tracker in a tripwire detection mode, wherein operating the asset tracker in the tripwire detection mode comprises:

transitioning the asset tracker from the low-power mode to the tripwire detection mode in response to detecting the travel motion of the asset tracker;

powering up the location module; and periodically checking whether the asset tracker has crossed a tripwire of the plurality of tripwires; and operating the asset tracker in a location reporting mode, wherein operating the asset tracker in the location reporting mode comprises:

transitioning the asset tracker from the tripwire detection mode to the location reporting mode in response to determining that the asset tracker has crossed the tripwire of the plurality of tripwires; and powering up the network interface to communicate a plurality of asset tracker locations to the telematics server.

2. The method of claim 1, wherein operating the asset tracker in the tripwire detection mode comprises:

frequently determining an asset tracker location of the asset tracker; and comparing the asset tracker location with the tripwire.

3. The method of claim 1, wherein detecting the travel motion of the asset tracker comprises detecting a plurality of acceleration values from a 3-axis accelerometer thereof.

4. The method of claim 2, wherein determining that the asset tracker has crossed the tripwire comprises comparing the asset tracker location to a line extending between a first point and a second point forming the tripwire.

5. The method of claim 1, further comprising:

determining whether a location reporting mode duration threshold has been exceeded; and in response to determining that the location reporting mode duration threshold has been exceeded transitioning the asset tracker from the location reporting mode to the low-power mode.

6. The method of claim 1, further comprising storing the zone definition.

7. The method of claim 1, further comprising in response to detecting that the travel motion has stopped, transitioning the asset tracker from the tripwire detection mode to the low-power mode.

8. The method of claim 1, wherein operating the asset tracker in the location reporting mode comprises frequently sending the plurality of asset tracker locations to the telematics server.

9. An asset tracker, comprising:

a controller;

a location module;

a network interface; and a memory coupled to the controller, the memory storing machine-executable programming instructions which, when executed by the controller, configure the asset tracker to:

operate in a low-power mode in which both the location module and the network interface are powered down;

detect a travel motion of the asset tracker;

operate in a tripwire detection mode, wherein operating the asset tracker in the tripwire detection mode comprises:

transitioning from the low-power mode to the tripwire detection mode in response to detecting the travel motion of the asset tracker;

powering up the location module; and periodically checking whether the asset tracker has crossed a tripwire; and operate in a location reporting mode, wherein operating the asset tracker in the location reporting mode comprises:

transitioning the tripwire detection mode to the location reporting mode in response to determining that the asset tracker has crossed the tripwire; and powering up the network interface to communicate a plurality of asset tracker locations to a telematics server.

10. The asset tracker of claim 9, wherein the machine-executable programming instructions which configure the asset tracker to operate in the tripwire detection mode comprise machine-executable programming instructions which cause the asset tracker to:

frequently determine an asset tracker location of the asset tracker; and compare the asset tracker location with the tripwire.

11. The asset tracker of claim 9, wherein the machine-executable programming instructions which detect the travel motion of the asset tracker comprise executing machine-executable programming instructions which detect a plurality of acceleration values from a 3-axis accelerometer of the asset tracker.

12. The asset tracker of claim 9, wherein the machine-executable programming instructions further configure the asset tracker to receive a zone definition comprised of a plurality of tripwires.

13. The asset tracker of claim 9, wherein the machine-executable programming instructions which configure the asset tracker to operate in the location reporting mode comprise machine-executable programming instructions which configure the asset tracker to frequently send the plurality of asset tracker locations to the telematics server.

14. A method in a telematics system including a telematics server, a telematics device coupled to a tractor, and an asset tracker coupled to a trailer, the asset tracker comprising a location module and a network interface, the method comprising:

the telematics server sending a zone definition comprising a plurality of tripwires to the asset tracker;

operating the asset tracker in a tripwire detection mode, wherein operating the asset tracker in the tripwire detection mode comprises:

transitioning the asset tracker from a low-power mode to the tripwire detection mode in response to detecting a travel motion of the asset tracker, wherein both the location module and the network interface are powered down in the low-power mode;

powering up the location module; and periodically checking whether the asset tracker has crossed a tripwire of the plurality of tripwires;

operating the asset tracker in a location reporting mode, wherein operating the asset tracker in the location reporting mode comprises:

transitioning the asset tracker from the tripwire detection mode to the location reporting mode in response to determining that the asset tracker has crossed the tripwire; and powering up the network interface to send a first plurality of locations thereof to the telematics server;

the telematics device sending a second plurality of locations thereof to the telematics server; and the telematics server determining that the tractor and the trailer are traveling together based on the first plurality of locations and the second plurality of locations.

15. The method of claim 14, further comprising the telematics server receiving the zone definition from an administration terminal.

16. The method of claim 14, further comprising the telematics server determining whether the tractor and the trailer should be traveling together.

17. The method of claim 16, wherein determining whether the tractor and the trailer should be traveling together comprises querying a telematics database based on a telematics device identifier of the telematics device and an asset tracker identifier of the asset tracker.

18. The method of claim 17, further comprising sending, by the telematics server, a notification to the telematics device in response to determining that the tractor and the trailer should not be travelling together.

19. The method of claim 17, further comprising sending, by the telematics server, a notification to an operator terminal in response to determining that the tractor and the trailer should not be travelling together.

20. The method of claim 14, wherein each of the first plurality of locations is associated with a respective first timestamp and each of the second plurality of locations is associated with a respective second timestamp, and the method further comprises:

matching the first plurality of locations against the second plurality of locations using the first and second timestamps; and determining that the tractor and the trailer are traveling together in response to determining a plurality of location matches between the first and second plurality of locations while both the asset tracker and the telematics device are in motion.

* * * * *